United States Patent [19]

Schwarz et al.

[11] Patent Number: 4,918,639
[45] Date of Patent: Apr. 17, 1990

[54] OVERLAPPED MULTIPLE-BIT SCANNING MULTIPLICATION SYSTEM WITH BANDED PARTIAL PRODUCT MATRIX

[75] Inventors: Eric M. Schwarz, Endicott; Stamatis Vassiliadis, Vestal, both of N.Y.

[73] Assignee: International Business Machines Corporation, Armonk, N.Y.

[21] Appl. No.: 116,172

[22] Filed: Nov. 3, 1987

[51] Int. Cl.$^4$ .............................................. G06F 7/52
[52] U.S. Cl. ..................................... 364/754; 364/757
[58] Field of Search ............... 364/754, 755, 756, 757, 364/758, 759, 760

[56] References Cited

U.S. PATENT DOCUMENTS 4,748,582 5/1988 New et al. ........................... 364/754

OTHER PUBLICATIONS

"Multiply-Addition—An Ultra High Performance Dataflow", IBM Technical Disclosure Bulletin, vol. 30, No. 3, Aug. 1987, pp. 982-987.

Primary Examiner—Eugene R. LaRoche
Assistant Examiner—T. Nguyen
Attorney, Agent, or Firm—Milton M. Field

[57] ABSTRACT

A multi-bit overlapped scanning multiplication system assembles modified partial products in a reduced, non-rectangular banded matrix. The rows of the matrix except for the first and last, are extended with bands of encoded extensions of limited length at the right and left ends of the partial product terms. The width of the significant bits of each partial product term is equal to $q-1+S-2$, where q is the width of the significant bits plus sign of the multiplicand and S is the number of bits which are overlapped scanned. Each partial product term is shifted $S-1$ bits from adjacent terms and is banded by encoded extensions to the terms. $S-1$ bits of encode are placed to the right of every terms except the last, the encode being based on the sign of the next partial product term; and $S-1$ bits of encoded sign extension are placed to the left of every term except the first, which has no sign extension, and last, to the left of which is placed an S bit encode. The bits of negative partial product terms are inverted, and a "hot 1" is encoded in the right extension in the previous row. The first bit of the multiplier is forced to zero so that the first partial product term is always positive or zero. Carry save adder trees are used to reduce each column of the matrix to two terms. When inputs to a carry save adder are known, the logic of the carry save adder is simplified to save chip space.

27 Claims, 18 Drawing Sheets

CARRY SAVE ADDER TREE

LAST PARTIAL
PRODUCT TERM

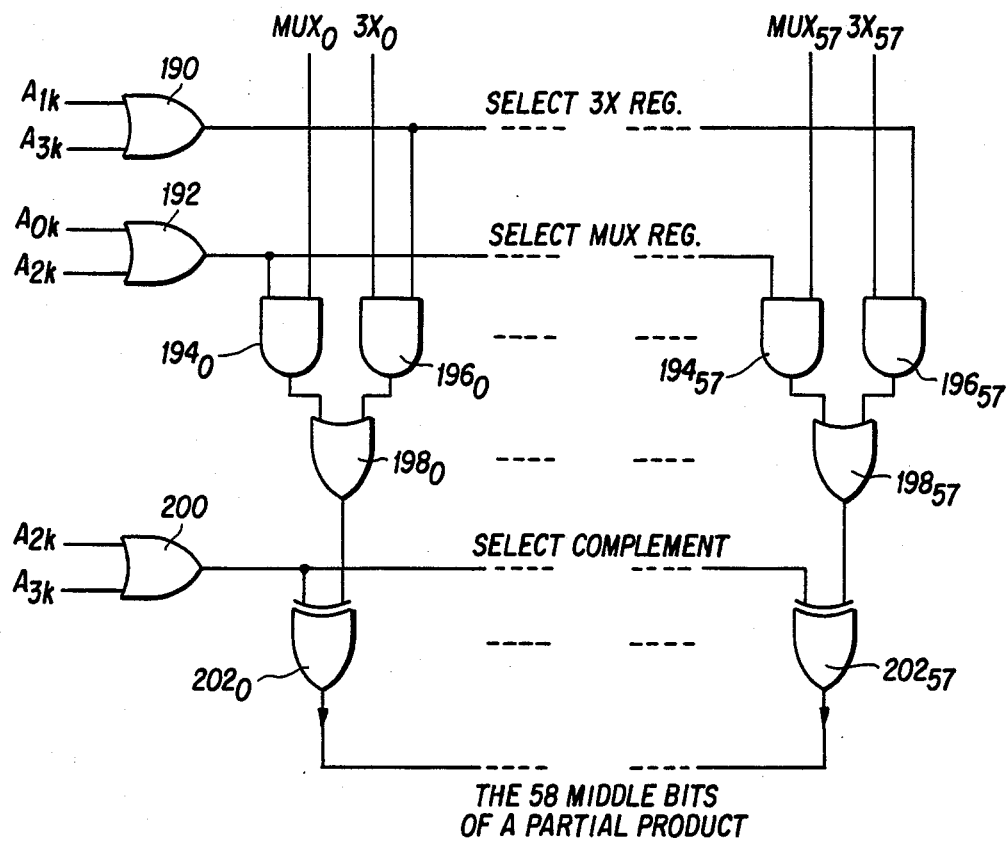
FIG. 32 2 TO 1 TRUE COMPLEMENT SELECT
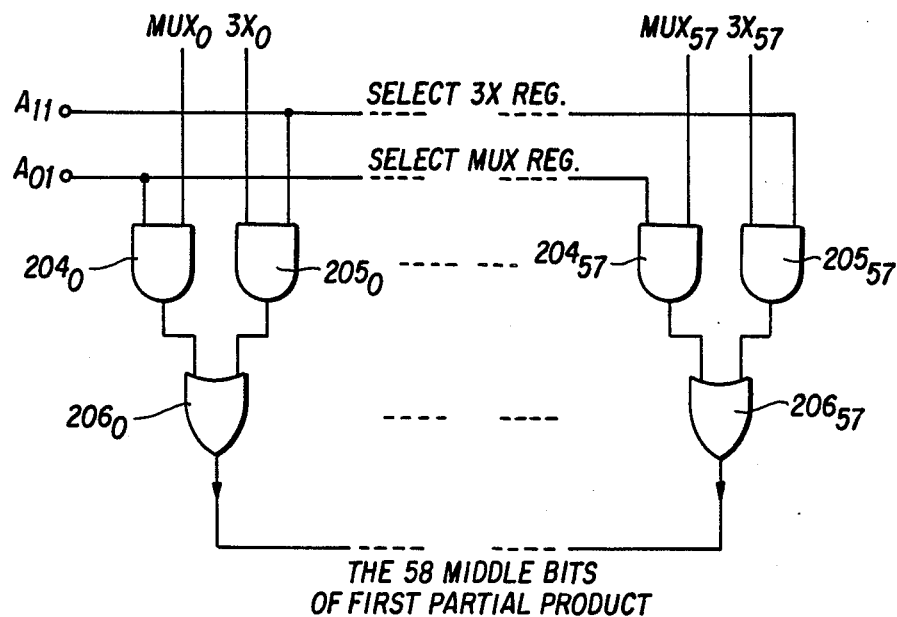
FIG. 33

OVERLAPPED MULTIPLE-BIT SCANNING MULTIPLICATION SYSTEM WITH BANDED PARTIAL PRODUCT MATRIX

BACKGROUND OF THE INVENTION

1. Field of the Invention

This invention relates to overlapped multiple-bit scanning multiplication systems and, more particularly, to such systems having more than three scanning bits with a reduced partial product matrix which is banded.

2. Brief Description of the Prior Art

One of the most widely used techniques for binary multiplication has been the uniform overlapped shift method for 3-bit scanning proposed by MacSorley in "High-Speed Arithmetic in Binary Computers," *Proceedings of the IRE*, Vol. 99, January 1961, pp. 67-91, as a modification of the Booth algorithm disclosed in "A Signed Multiplication Technique," *Quarterly Journal of Mechanical and Applied Math*, Vol. 4, Part 2, 1951, pp. 236-240. Another 3-bit overlapped scanning scheme is shown in "Multiply-Addition—an Ultra High Performance Dataflow", *IBM Technical Disclosure Bulletin*, Vol. 30, No. 3, August 1987, pp. 982-987, the subject matter of which, at the time the present invention was made, was owned by the assignee of the present application. More than 3-bit overlapped scanning has seldom been used, primarily because it has required special hardware, possibly more chip area, and more difficult partial product selections. In view, however, of improvements in circuit densities over the past few years, and because more than 3-bit scanning may improve the overall speed of the multipliers, there have been several recent proposals for more than 3-bit overlapped scanning designs. See, for example, Waser et al., *Introduction to Arithmetic for Digital System Designers*, Chapter 4, CBS College Publishing, 1982, and Rodriguez, "Improved Approach to the Use of Booth's Multiplication Algorithm," *IBM Technical Disclosure Bulletin*, Vol. 27, No. 11, April 1985, pp. 6624-6632.

Multipliers of this type employ a matrix of the partial products selected in response to each scan. For summing the partial products in the matrix, carry save adder trees are typically used. Methods for reducing the trees have been suggested by Wallace in "A Suggestion for a Fast Multiplier," *IEEE Trans. Electronic Computers*, Vol. EC-13, Feb. 1964, pp. 14-17 and Dadda in "Some Schemes for Parallel Multipliers," *Alta Frequenza*, Vol. 34, March 1965, pp. 349-356. The method proposed by Dadda results in a hardware saving when compared to that of Wallace as is proven by Habibi et al. in "Fast Multipliers," *IEEE Trans. On Computers*, Feb. 1970, pp. 153-157. Mercy, U.S. Pat. No. 4,556,948, teaches a method to improve the speed of the carry save adder tree by skipping carry save adder stages. After the carry save adder tree reduces the number of term to two, the two terms are then added with a two-input 2-1 adder. Such 2-1 adders can be designed using conventional technology or some scheme for fast carry look ahead addition as proposed, for example, by Ling in "High-Speed Binary Adder", *IBM J. Res. Develop.*, Vol. 25, No. 3, May 1981, pp. 156-166.

SUMMARY OF THE INVENTION

It is an object of this invention to provide improved multi-bit overlapped scanning multiplication systems which assemble modified partial products in a reduced matrix. The matrix is reduced by avoiding any need for adding extra rows to the partial product terms and by using rows of reduced length. When a negative partial product term is inverted, the need for a "hot 1" is encoded in an extension to the partial product term in the previous row, thus avoiding the need for adding a row for this purpose. Instead of extending the rows to the left edge of the matrix, all of the rows, with the exception of the first and last, are extended with bands of encoded extensions of limited length at the right and left ends of the partial product terms. Because the teachings of the invention are particularly applicable for overlapped scans of more than three bits, fewer partial product terms and, hence, fewer rows are required.

The multiplication system of the invention takes advantage of the availability of a high circuit count per chip and emphasizes high speed (with very few iterations) multiply implementations. By reducing the matrix and simplifying the adder trees, the area of the chip required is minimized. A matrix is developed comprising reduced width rows of modified partial products, which, when summed, equal the final product. The partial products are also modified so as to minimize the cell count required to sum them in an adder tree. A band matrix of minimum width is used, thus reducing the required width of the adder in the adder tree.

According to the invention, a matrix of S-bit overlapped scanned partial product terms is formed in accordance with an algorithm of the invention. The matrix formed from the encoded partial product terms is a banded partial product matrix, and the sum of the rows of the matrix yields the final product. In the algorithm, a determination is made of the values of S, $n-1$ and $q-1$, where S is the number of bits scanned, n is the width of the significant bits plus the sign of the multiplier, and q is the width of the significant bits plus sign of the multiplicand. The maximum width and number of the partial product terms are determined. The partial product terms are placed in a matrix, the width of the significant bits of each partial product term being equal to $q-1+S-2$. Each partial product term is shifted $S-1$ bits from adjacent terms to form a non-rectangular matrix which is banded by encoded extensions to the partial product terms. $S-1$ bits of encode are placed to the right of every term except the last, the encode being based on the sign of the next partial product term; and an $S-1$ bit encoded sign extensions are placed to the left of every term except the first term, which has no sign extension, and the last term, to the left of which is placed an S bit code. Ones and zeros are placed in bit positions in the extensions.

When a partial product term is negative, its bits are inverted. In order to add the required "hot 1", the encoded extension to the right of the partial product term in the previous row is encoded for a "hot 1". If the partial product of a given row is positive, the $S-1$ bit positions appended to the previous rows are "0"s; and if the partial product in the given row is negative, the $S-1$ bits appended to the previous row comprise $S-2$ "0"s followed by "1". Since there is no row previous to the first, the first bit of the multiplier is forced to zero so that the partial product term in the first row is never negative (always positive or zero).

The signs of the partial product terms also determine the encoding of the sign extension to the left of the partial product terms. Because of the truncation of bits not involved with the product, no encoded sign extension is provided or needed to the left of the first partial product term. For all other partial product terms except the last, the sign extension to the left of a partial product term has $S-1$ bits. The encoding is $S-1$ "1"s for a positive partial product and $S-2$ "1"s followed by one "0" to the right of the $S-2$ "1"s if the partial product is negative. A coded extension of S bits is appended to the left of the last partial product term. When the last partial product term is positive, the encoding is a "1" followed by $S-1$ "0"s; and when the last partial product term is negative, the encoding is a "0" followed by $S-1$ "1"s.

Carry save adder trees are used to reduce each column of the matrix to two terms. Each carry save adder reduces three rows to two rows. Where one, two or three of the inputs to a carry save adder are known, the logic of the carry save adder is simplified to save chip space.

The multiplicand X and the multiplier Y are typically the fraction part of sign magnitude numbers in binary notation. It is to be understood, however, that the multiplier of the invention is also applicable to the multiplication of unsigned numbers.

The system of the invention, when $S=4$, includes means for computing partial products of X, 2X, 4X and 0, means for computing the partial product 3X, and means for computing the boundary bits to be used in coded extensions of the partial products. Decode means derives first code terms $S_0$ and $S_1$, second code terms $A_0$, $A_1$, $A_2$ and $A_3$ and third code terms $R_0$ and $R_1$ from the scanned bits. Multiplexor means selects one of the X, 2X, 4X and 0 partial products in response to the first code terms $S_0$ and $S_1$. Selection means responsive to second code terms $A_0$, $A_1$, $A_2$, and $A_3$ selects one of the selected partial product X, 2X, 4X or 0 from the multiplexor means or the partial product 3X and selects the sign of the partial product, inverting the bits of the partial product term if the sign is negative. Boundary bit logic means responsive to the third code term $R_0$ and $R_1$ select the boundary bits to the right of the previous row of the matrix and to the left of the present row.

BRIEF DESCRIPTION OF THE DRAWINGS

These and other objects, features and advantages of the invention will be more fully appreciated with reference to the accompanying figures, in which:

FIGS. 32 and 33 are schematic circuit diagrams of the portions of the 2 to 1 True/Complement Select circuit of the embodiment of the invention dedicated, respectively, to all partial products but the first and to the first partial product;

FIG. 37 is a diagram showing a band matrix formed for a particular implementation of the invention using four-bit scanning, a fraction having fifty-six bits and nineteen partial product terms;

FIG. 38 is a diagram showing the rows to be added in the band matrix of the particular implementation illustrated in FIG. 37 in the first stage of the carry stage adder tree;

FIG. 39 is a diagram showing the rows to be added in the particular implementation in the second stage of the carry save adder tree;

FIG. 40 is a diagram showing the rows to be added in the particular implementation in the third stage of the carry save adder tree;

FIG. 42 is a diagram showing the rows to be added in the particular implementation in the fifth stage of the carry save adder tree;

FIG. 43 is a diagram showing the rows to be added in the particular implementation in the sixth stage of the carry stage adder tree; and FIG. 44 is a diagram showing the sum and carry outputs of the carry save adder tree for the particular implementation.

DETAILED DESCRIPTION OF THE PREFERRED EMBODIMENT

Figure 1:
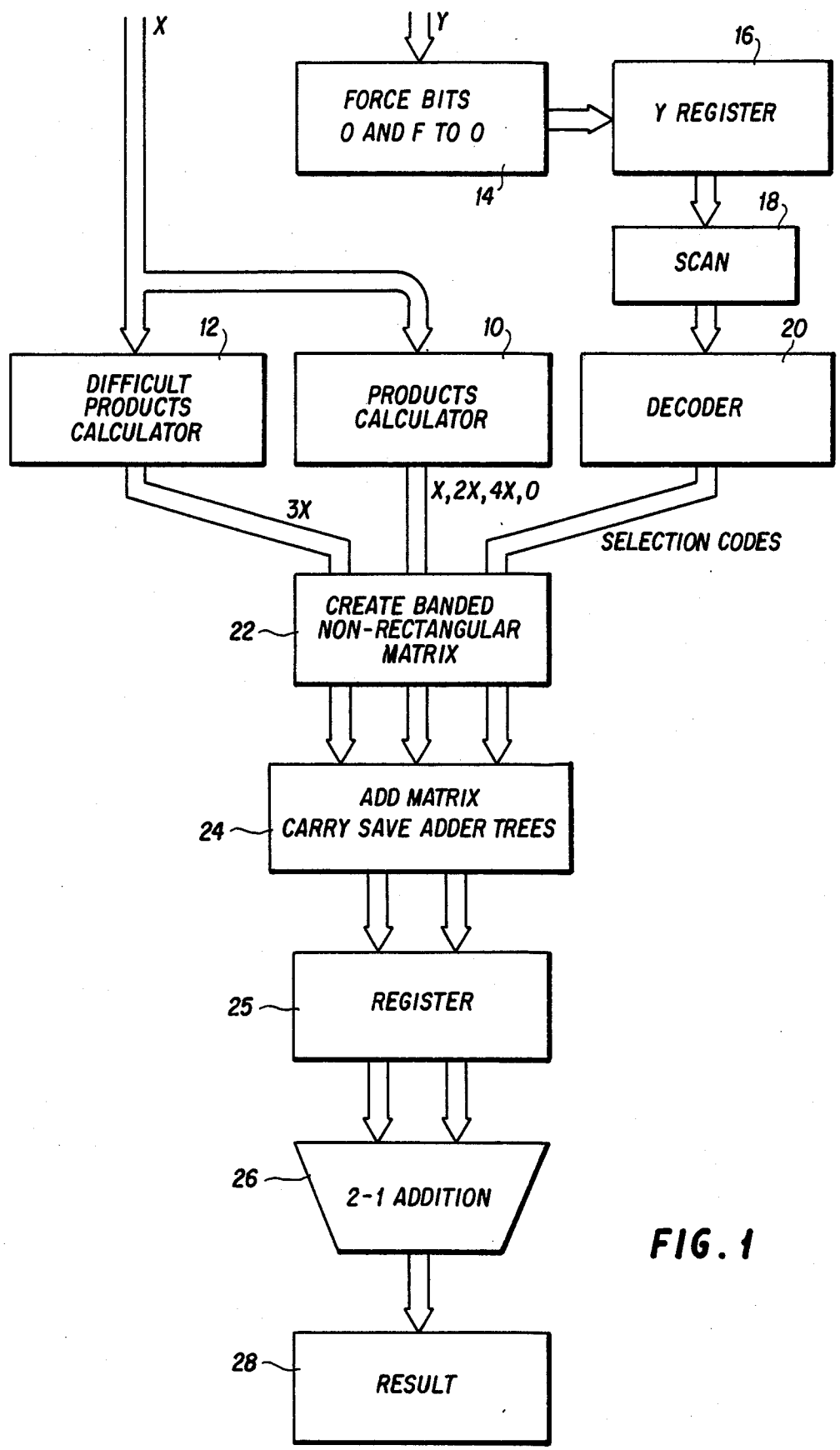
FIG. 1 is a schematic block diagram showing an embodiment of a system of the invention.
Figure 2:
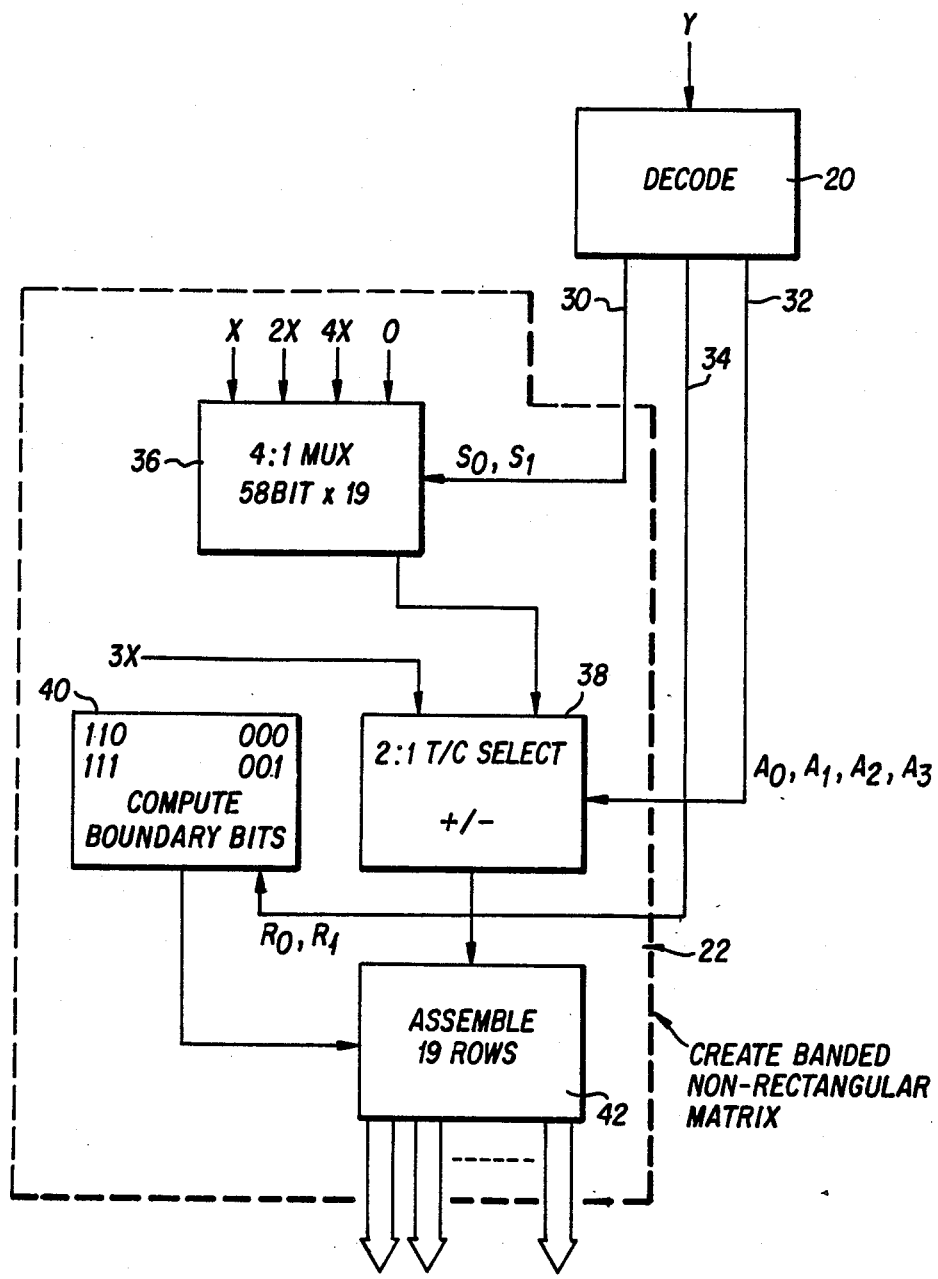
FIG. 2 is a schematic diagram showing a detail of the embodiment of FIG. 1.

An overlapped multi-bit scanning multiplication system of the invention is shown in FIG. 1, and a detail thereof is shown in FIG. 2. The system as shown in these figures, in particular, illustrates the case in which the system uses four-bit scanning with one bit of overlap.

The system will multiply a multiplicand X by a multiplier Y. Typically, X and Y are derived from floating point sign magnitude numbers in binary notation. Such numbers include a sign, a fraction and an exponent with X and Y representing the fraction portion only of these numbers. As is customary in the art, the sign and exponent portions of the numbers to be multiplied are separated and the sign and exponent calculations are dealt with separately from the multiplication of the fractions. Accordingly, it is to be understand that the signs and exponents of X and Y have already been separated, will be separately computed and then appropriately combined with the result computed by the system of the invention. Although the invention will be illustrated by the case of the multiplication of the fractions of floating point numbers, it is to be understood that it is also applicable to the case of the multiplication of a pair of unsigned binary numbers.

In the system shown in FIG. 1, the multiplicand X is applied to a pair of product calculators. Products calculator 10 computes certain simple products of X which in the case of a four-bit scan system are, as shown, the products X, 2X, 4X and 0. As is known in the art, these products are easily derived from X. The product X is simply X itself. 2X is derived from X by shifting X one place, and 4X is derived from X by shifting X two places. A difficult products calculator 12 calculates products requiring a more complex computation. In the illustrative case of a four-bit scan, only the product 3X need be computed. This is accomplished by deriving 2X from X by shifting X one place and then employing an adder to add X and 2X.

The multiplier Y is first subjected to a manipulation at 14 in which the first bit $Y_0$ and last $Y_F$ of Y are forced to zero for reasons to be explained more fully hereinbelow. This manipulation may be performed, for example, by means of placing Y in a register the first and last places of which are tied to logic level 0.

Multiplier Y, with its first and last bits so modified, is then placed in Y register 16 and is then scanned by scanning means 18. As is known in the art, scanning means 18 will successively output sets of S bits of Y, successive scans of Y overlapping one bit from the previous scan. For example, in the illustrative case when S=4, the first scan will output the values of the first four bits of Y, the second scan will output the values of the fourth through the seventh bits of Y, the third scan will output the values of the seventh through tenth bits of Y and so on until all of the bits of Y have been scanned. If, for example, Y consists of fifty-six bits, nineteen scans of Y will be output by scanning means 18.

These outputs are applied to a decoder 20 which, as will be explained below, will provide three sets of selection code terms. These will be used in conjunction with the products of X from calculators 10 and 12 to select partial products of X and modify these partial products by appending thereto appropriate encoded extensions at the left and right sides thereof to assemble the banded non-rectangular matrix at 22 as will be explained more fully below.

The matrix is then added by a set of carry save adder trees 24 which reduce the columns of the matrix to no more than two terms. These are then added, typically in the next cycle, by 2:1 adder 26, yielding the result at 28. In the case of floating point sign magnitude numbers, this result is then combined with the results of the sign and exponent calculations to provide the final result of the multiplication.

Turning to FIG. 2, it will be seen that decoder 20 provides for each scan of Y three sets of code terms. On decode output 30 are code terms $S_0$ and $S_1$, on decode output 32 are code terms $A_0$, $A_1$, $A_2$ and $A_3$, and on decode output 34 are code terms $R_0$ and $R_1$. The manner in which these codes are derived from the scans of Y will be explained more fully below.

The products X, 2X, 4X and 0 of X calculated by products calculator 10 are applied as inputs to a 4:1 multiplexor 36. As each scan of Y is completed, the code terms $S_0$ and $S_1$ are applied to multiplexor 36 to select one the multiples of X in a manner to be described more fully below. Thus, in the example given, nineteen successive selections are made and applied as one input to 2:1 true complement selector 38. Another input to selector 38 is the 3X output from difficult product calculator 12. In a manner to be explained more fully below, code terms $A_0$, $A_1$, $A_2$ and $A_3$ select whether the partial product to be selected is the partial product received from multiplexor 36 or the 3X partial product. These code terms also select the sign of the partial product, whether it is + or −. If the − sign is selected, the selected partial product is inverted in selector 38 in a manner to be explained hereinafter.

An important feature of the present invention is the coded bit extensions which are appended to the left and/or the right of the partial products. These are generated in compute boundary bits logic circuit 40 in a manner to be explained more fully below. Logic circuit 40 is responsive to code terms $R_0$ and $R_1$ as will be explained below.

Each successive partial product, as provided by select circuit 38 and as modified by boundary bit logic 40, is then assembled as indicated at 42 as successive rows of the matrix. As will be shown presently, each successive partial product is shifted to the right relative to the previous row by S−1 bit positions. The resulting matrix is thus non-rectangular and banded by the encoded extensions and is thus reduced when compared to the matrices used in the prior art overlapped scanning multipliers.

As explained above, each column of the matrix is added by a carry save adder tree. The matrix structurally comprises hardwired connections between select circuit 38 and boundary bit circuit 40 to the inputs of the carry save adder trees.

Figure 3:
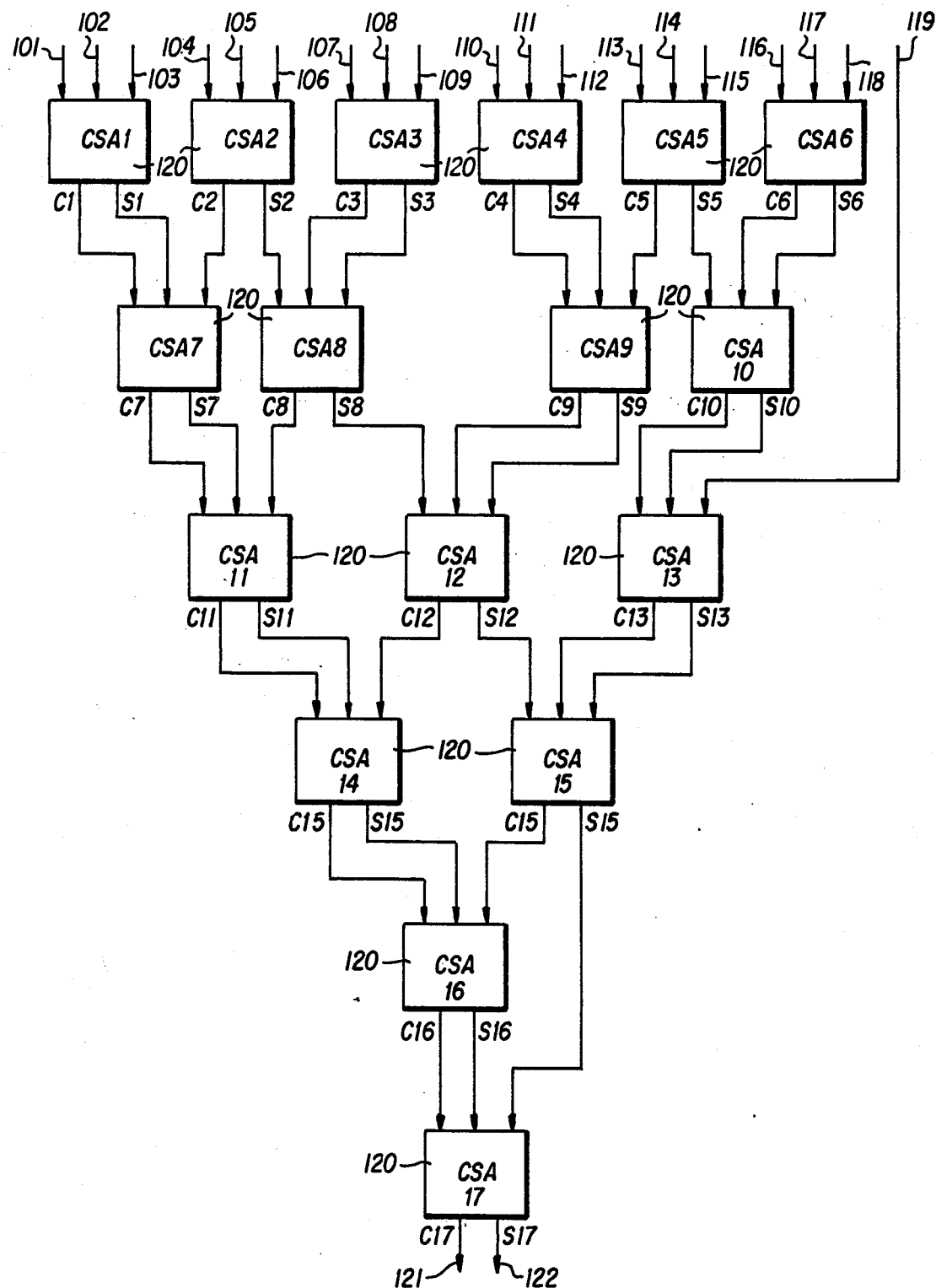
FIG. 3 is a schematic block diagram of a carry save adder tree of the system of FIG. 1.

One of the carry save adder trees is shown in FIG. 3, being the worst case—that is, the most complex carry save adder tree needed for the illustrative example which requires nineteen partial products and thus nineteen rows in the matrix. Because, as already explained, successive partial products are shifted S−1 bits, the columns at either side the matrix will include several columns which have fewer than a full complement of nineteen rows. The carry save adder trees for these columns will be correspondingly simpler. Returning to FIG. 3 inputs 101, 102, 103, 104, 105, 106, 107, 108, 109, 110, 111, 112, 113, 114, 115, 116, 117, 118 and 119 represent the successive rows of the column of the matrix being summed. These inputs are applied, in threes, as inputs to carry save adder means 120 each of which provides two outputs, a "carry" and a "save" output. These, in turn, provide additional inputs, in sets of three, to additional carry save adder means of the tree, as shown, until the final carry save adder means 120 provides the two outputs 121 and 122 to 2:1 adder 26. As will be explained more fully below, carry save adder means 120 are, for the most part, carry save logic circuits. However, in cases where one or more of the inputs to a particular carry save adder means is, or are, known, simple logic means may be substituted to reduce the area of the chip required.

We will now consider the encoding of the matrix for S-bit overlapped scanning. The multiplier and multiplicand are considered to be represented as floating point numbers which consist of a sign, an exponent and a fraction in binary notation. As is customary in the art, the sign and exponent calculation are handled separately and do not form part of the present invention. Therefore, hereinafter any reference to the multiplicand, multiplier or product refers only to the binary representation of the fraction in which the zero bit is the sign bit (always equal to zero, because the fraction is a magnitude and magnitudes are always positive). Bit one is the most significant bit, and bit n−1 is the least significant bit.

Letting q be equal to the width of the multiplicand, Z be a decimal number and $z^i$ be its two's complement notation, it can be proven:

$$Z = -z_0 + \sum_{i=1}^{n-1} (z_i \, 2^{(-i)}),$$

where $z_0$ is the sign bit and n−1 is the width of the significant bits of z.

Assuming that Y and X are, respectively, the multiplier and multiplicand in sign magnitude notation, that P is the product of X and Y, and Wp is the width of the product, and given that only magnitudes are considered, it can be written:

$$Y = -y_0 + \sum_{i=1}^{n-1} (y_i 2^{(-i)})$$

$$X = -x_0 + \sum_{i=1}^{q-1} (x_i 2^{(-i)})$$

$$P = -p_0 + \sum_{i=1}^{W_p-1} (p_i 2^{(-i)}).$$

Since $x_0 = y_0 = p_0 - 0$, it follows that:

$$Y = \sum_{i=1}^{n-1} (y_i 2^{(-i)})$$

$$X = \sum_{i=1}^{n-1} (x_0 2^{(-i)})$$

$$P = \sum_{i=1}^{W_p-1} (p_0 2^{(-i)}),$$

which are the correct expressions for the magnitudes of sign magnitude numbers.

Let us now assume that S equals the number of bits which are overlapped scanned assuming a one bit overlap, that "coefficient" refers to the number which multiplies X to form the multiple denoted by W, W being equal to the coefficient multiplied by X which is formed by $x_1 \ldots x_{q-1}$, that "partial product" refers to a number which is formed by overlapped scanning, the sum of all partial products resulting in the product P, and that M+1 is the number of partial product terms. It can be shown that S bit overlapped scanning yields:

1. M+1 partial products, M+1 being equal to $$\left(\frac{n-1-r}{S-1}\right) + 1,$$

where r is the remainder of $$\frac{n-1}{S-1}.$$

2. The greatest possible multiple of the multiplicand has a coefficient W equal to $2^{(S-2)}$, and the least possible multiple thereof has a coefficient W equal to $-2^{(2-2)}$.

3. Each partial product term can be represented by the ith multiple times $2^{(1-i(S-1))}$, where i is an integer greater than or equal to 1 and less than or equal to M+1.

4. Assuming that the scanning of the multiplication starts at the most significant bits, the multiple of the i+1th partial product is multiplied by $2^{-(S-1)}$ with respect to the ith partial product; thus the i+1th partial product can be represented by a shift of S−1 bits to the right.

The principles of the present invention are formulated in a number of theorems which will then be proven.

Theorem 1: The multiples can be represented in two's complement binary notation (actually, one's complement plus a hot "1" for the negative terms) with q−1+S−2 bits plus the possibility of a hot "1".

Proof: Given that the greatest $|W| = 2^{(S-2)}$, any multiple WX will be shifted to a maximum of S−2 places; and given that the significant multiplicand's length is q−1, then the maximum WX can be presented with q−1+S−2 bit positions. It is also given that a sign extension will not change the value of WX. If $|W|$ happens to be less than the maximum, it can be concluded that WX can be represented by q−1+S−2 bit positions. W may assume positive or negative values, and therefore WX may be either positive or negative. Since it is given that a negative number can be expressed as a one's complement number with the addition of a hot "1", any multiple can be represented by q−1+S−2 bits with the possibility of adding a hot "1" when negative.

We shall now consider the formation of the matrix. With the previous assumptions, a matrix is formed in which each row represents a partial product term. The sum of the rows will equal the final product excluding some bits of the sum of the matrix that are overflows. A convention is adopted to place the left most scanned partial product (most significant) in the first row followed by the rest of the terms in successive rows as they are scanned to the right. Thus, i represents the row of the matrix. A band matrix is formed except for the need to sign extend and to add the hot "1"s to the negative terms. To create a true band matrix, which enables the use of reduced width adders, two steps are taken:

Step 1: The hot "1"s are encoded into the band.

Step 2: The sign extension is encoded into the band.

As used in this specification and the appended claims, the term "banded partial product matrix" may be defined as referring to a reduced, non-rectangular matrix in which successive rows are shifted and in which bands of encoding bits are appended on each side of the row. The number of bits in the bands is limited and is, in fact, related to the number S of bits scanned as will be shown below.

Thus, the partial products are modified but, as will be shown, without altering the final product. The partial product rows are of minimum width, and the number of partial products is reduced.

Step 1 is formulated in Theorem 2: Given that the first partial product term is always positive and that each row of the matrix has the multiples shifted S−1 bits from each other, S−1 bits can be placed on the prior partial product terms to encode the need for a hot "1" to be added to the negative terms. The S−1 bits are the bits immediately to the right of each multiple except the M+1th multiple since there is no term after it. They are all equal to zero, if the following term (the i+1th term considering the current term to be the ith term) is positive; and a one is in the least significant bit position of the S−1 bits and the rest are zeros, if the next partial product term is negative.

Proof: $PP_i$ = Partial Product term $i = L_i 2^{-(i(S-1)-1)}$, where $L_i$ is the ith Multiple = $XW_i$.

$PP_{i+1}$ = Partial Product term $i+1 = L_{i+1} 2^{-((i+1)(S-1)-1)}$ $PP_{i,i+1}$ = The sum of $PP_i$ and $PP_{i+1} = L_i 2^{-(i(S-1)-1)} + L_{i+1} 2^{-((i+1)(S-1)-1)}$. If $L_{i+1}$ is negative, then it is represented in one's complement plus one as:

$L_{i+1} = (\overline{X|W_{i+1}}) +$ "hot 1" with $(\overline{X|W_{i+1}})$ interpreted as the bit by bit inversion of $L_{i+1}$. Given that the last bit of $L_{i+1}$ is positioned at $2^{-(q-1+S-2)}$, the "hot 1" must be added at position $2^{-(q-1+S-2+(i+1)(S-1)-1)}$ for the i+1 partial product term. The implication is that when $L_{i+1}$ is negative, $PP_{i,i+1} = L_i 2^{-(i(S-1)-1)} + \overline{X|W_{i+1}|}$
$2^{-((i+1)(S-1)-1)} + 2^{-(q-1+S-2+S-1+i(S-1)-1)} = (L_i + 2^{-(q-1+S-2+S-1)}) \quad 2^{-(i(S-1)-1)} + (\overline{X_p|W_{i+1}|})$
$2^{-((i+1)(S-1)-1)}$.

The last position occupied by $L_i$ is $q-1+S-2$. Thus, it can be concluded that when $L_{i+1}$ is negative, $PP_{i+1}$ is equivalent to the bit by bit inversion of $L_{i+1}$ and the addition of $S-1$ positions to $L_i$ with $S-2$ zeros following the $q-1+S-2$ position and a 1 at position $q-1+S-2+S-1$. Given that the addition of zeros after $q-1+S-2$ will not change the value of any $L_i$, it can be concluded that if $L_{i+1}$ is positive, $L_i$ can be extended by $S-1$ zeros after $q-1+S-2$ positions. Since the first row is insured to be positive, there is no need to have an additional row for the correct representation of the matrix. Also, since the $M+1$ row does not precede any other row, there is no need for the additional $S-1$ bits. Accordingly, it can be concluded that Theorem 2 holds true.

Step 3 is formulated in Theorem 3: The sign-extension of the negative term is encoded into the $S-1$ bits to the left of the multiples most significant bit, and a hot "1" term is added at the bit location of the least significant bit of the $M+1$th term encoding. The encoding in general for all partial products except the first term which is always positive, is as follows: The encoding is $S-1$ ones for a positive partial product and $S-2$ ones and one zero (to the right of the $S-2$ ones) if the partial product is negative.

Proof: It must be proven that the lower triangle of the matrix which has the encoding in bands as taught by the present invention, as in Step 2 (which will be referred to below as the "new" scheme), if summed row by row is equivalent to a "regular" sign extended lower triangular matrix summed.

A "regular" sign-extended lower triangular matrix is the known practice of sign extending the lines of the matrix to fill out the triangle to the left and below the partial products so that the correct result is obtained when the rows of the matrix are summed. According to the "regular" sign extension principle, a row is extended when a term is negative by inserting ones in every bit position to the left of the partial product so that each row is filled out to the leftmost bit position of the matrix.

Let $A_i$ represent the sign of the ith row such that it is one, if, and only if, the partial product in that row is negative. Let LTMSR be the Lower Triangular Matrix Sum if "regular", and LTMSN be the Lower Triangular Matrix Sum if the "new" (Step 2) scheme is used. The "regular" matrix is sign-extended wherever there is a negative term. In these rows there are ones in every bit to the left of multiple of the multiplicand. The most significant one is the most significant bit of the matrix which is $2^{(-1)}$. The sum of a string of ones is equal to 2 to the power one place more significant than the string, minus 2 to the power of the least significant bit (from the well-known string property which is the basis of Booth encoding). This is proven by the following which uses the law for the sum of a geometric series.

$2^{(-1)} + 2^{(-2)} + \ldots 2^{(-j)} =>$ $2^{(-j)} (2^{(j-1)} + 2^{(j-2)} + \ldots + 2^{(0)}) =>$ $2^{(-j)} (2^{(0)} + \ldots + 2^{(j-2)} + 2^{(j-1)}) =>$ -continued $2^{(-j)} \left( \frac{1 - 2^{(j)}}{1 - 2} \right) =>$ $2^{(-j)} (2^{(j)} - 1) =>$ $2^{(0)} - 2^{(-j)}$.

Thus, the sign extension for the ith row is equal to $2^{(0)} - 2^{(-(i-1)(S-1))}$. This gives us:

$$LTMSR = \sum_{i=2}^{M+1} A_i 2^{(0)} - A_i 2^{(-(i-1)(S-1))}$$

$$LTMSR = \sum_{i=2}^{M+1} A_i 1 - A_i 2^{(-(i-1)(S-1))}.$$

Excluding nonfractional parts which are overflows:

$$LTMSR = \sum_{i=2}^{M+1} - A_i 2^{(-(i-1)(S-1))}.$$

Using Step 2, $$LTMSN = \left( \sum_{i=2}^{M+1} \left( \sum_{j=0}^{S-2} A_i 2^{(-(i-1)(S-1)+j)} + \sum_{j=1}^{S-2} \overline{A_i} 2^{(-(i-1)(S-1)+j)} \right) \right) + 2^{(-M(S-1))} =$$

$$\left( \sum_{i=2}^{M+1} \left( \sum_{j=0}^{S-2} A_i 2^{(-(i-1)(S-1)+j)} + \sum_{j=0}^{S-2} \overline{A_i} 2^{(-(i-1)(S-1)+j)} \right) - A_i 2^{(-(i-1)(S-1))} \right) + 2^{(-M(S-1))} =$$

$$\left( \sum_{i=2}^{M+1} \left( \sum_{j=0}^{S-2} (A_i + \overline{A_i}) 2^{(-(i-1)(S-1)+j)} \right) - A_i 2^{(-(i-1)(S-1))} \right) + 2^{(-M(S-1))}.$$

$$LTMSN = \left( \sum_{i=2}^{M+1} \left( \sum_{j=0}^{S-2} 1 \cdot 2^{(-(i-1)(S-1)+j)} \right) - A_i 2^{(-(i-1)(S-1))} \right) + 2^{(-M(S-1))},$$

where $\sum_{i=2}^{M+1} \sum_{j=0}^{S-2} 1 \cdot 2^{(-(i-1)(S-1)+j)} =$ $2^{(-1)} + \ldots 2^{(-M(S-1))} = 2^{(-M(S-1))} (2^{(M(S-1)-1)} + \ldots + 2^{(0)}) =$ $2^{(-M(S-1))} (2^{(0)} + \ldots + 2^{(M(S-1)-1)}).$ Using the formula for the sum of a geometric series:

$(2^{(0)} + \ldots + 2^{(M(S-1)-1)}) = \frac{(1 - 2^{(M(S-1))})}{(1 - 2)} =$ $\frac{(1 - 2^{(M(S-1))})}{(-1)} = 2^{(M(S-1))} - 1.$ -continued Therefore, $$\sum_{i=2}^{M+1} \sum_{j=0}^{S-2} 1 \cdot 2^{(-(i-1)(S-1)+j)} = 2^{(-M(S-1))}(2^{(M(S-1))} - 1) =$$

$$2^{(0)} - 2^{(-M(S-1))}.$$

And, $$LTMSN = \left(\sum_{i=2}^{M+1} - A_i 2^{(-(i-1)(S-1))}\right) + 2^0 - 2^{(-M(S-1))} +$$

$$2^{(-M(S-1))}$$

$$LTMSN = \left(\sum_{i=2}^{M+1} - A_i 2^{(-1(i-1)(S-1))}\right) + 1.$$

Excluding overflows, which are any nonfractional terms, LTMSR equals the addition of the $S-1$ bit encodings plus the hot "1" which was added as $2^{(-M(S-1))}$ which equals LTMSN. Thus, Step 2 is a valid way of extending the sign of the terms and making the matrix into a banded matrix with the final product remaining valid.

Theorem 4: The hot "1" that is added at position $2^{(-M(S-1))}$ can be encoded into the $M+1$ row's encoding creating an S bit encoding, starting at position $2^{(-(M-1)(S-1))}$ with 1 for a positive row and 0 for a negative row and followed by $S-1$ zeros for a positive row or $S-1$ ones for a negative row.

Proof: The last encoding plus the hot "1" equal the following:

$$= \left(\sum_{j=0}^{S-2} \overline{A(M+1)} 2^{(-((M+1)-1)(S-1)+j)} + \right.$$

$$\left. \sum_{j=1}^{S-2} A(M+1) 2^{(-((M+1)-1)(S-1)+j)}\right) + 2^{(-M(S-1))}$$

$$= \left(\sum_{j=0}^{S-2} \overline{A(M+1)} 2^{(-M(S-1)+j)} + \right.$$

$$\left. \sum_{j=1}^{S-2} A(M+1) 2^{(-M(S-1)+j)}\right) + 2^{(-M(S-1))}.$$

For the $M+1$ partial product negative, $A(M+1)=1$, and the encoding equals the following:

$$= \sum_{j=1}^{S-2} 2^{(-M(S-1)+j)} + (-M(S-1))$$

$$= \sum_{j=0}^{S-2} 2^{(-M(S-1)+j)}.$$

This is an encoding of $S-1$ ones.

For the $M+1$ partial product positive, $A(M+1)=0$, and the encoding equals the following:

$$= \sum_{j=0}^{S-2} 2^{(-M(S-1)+j)} + 2^{(-M(S-1))}$$

$$= 2^{(-(M-1)(S-1))} - 2^{(-M(S-1))} + 2^{(-M(S-1))}$$

-continued $$= 2^{(-(M-1)(S-1))}.$$

This is a one at position $2^{(-(M-1)(S-1))}$. Thus, if an encoding between bits $(-(M-1)(S-1))$ and $(-M(S-1))$ is used, which is S bits and adopts the form as shown in Theorem 4, and S bit encoding can be used on the last partial product which is the addition of the $S-1$ bit sign extension encoding and the additional hot "1" needed for the whole sign extension encoding of all the partial product terms.

It was stated in the comparison of LTMSN and LTMSR that both representations could create overflows which were considered to be any portion greater than one. This sub-section proves the multiplication of two fractional numbers always results in a fractional product, in other words a product less than one.

If $P_{max}$ is $<1$, then for all $P$, $P<1$.

$$P_{max} = X_{max} Y_{max}$$

$$X_{max} = \sum_{i=1}^{q-1} 1 \cdot 2^{(-i)} = 2^{(-1)} + 2^{(-2)} + \ldots + 2^{(-q+1)}$$

$$= 2^{(-q+1)}(2^{(q-2)} + \ldots + 2^{(0)})$$

$$= 2^{(-q+1)}(2^{(0)} + \ldots + 2^{(q-2)})$$

$$= 2^{(-q+1)} \frac{(1 - 2^{(q-1)})}{1 - 2}$$

$$= 2^{(-q+1)}(2^{(q-1)} - 1)$$

$$= 1 - 2^{(-q+1)}.$$

Similarly, $$Y_{max} = 1 - 2^{(-n+1)}.$$

Therefore, $$P_{max} = (1 - 2^{(-q+1)})(1 - 2^{(-n+1)})$$

$$= 1 - 2^{(-q+1)} - 2^{(-n+1)} + 2^{(-q-n+2)}$$

$$= 1 - (2^{(-q+1)} + 2^{(-n+1)}) + 2^{(-q-n+2)}.$$

To prove $P_{max}$ is less than one, one must prove that $$(2^{(-q+1)} + 2^{(-n+1)}) > 2^{(-q-n+2)}$$

This can be proven given that $q+1 \geq 1$ and $n+1 \geq 1$; otherwise there would be no multiplier or multiplicand.

$$2^{(q-1)} > 1 \text{ and}$$

$$2^{(n-1)} > 1.$$

Thus, $$2^{(q-1)} + 2^{(n-1)} > 1.$$

Multiplying both sides by the positive fraction $2^{(-q-n+2)}$ yields the following:

$$2^{(-q-n+2)}(2^{(q-1)} + 2^{(n-1)}) > 2^{(-q-n+2)}$$

$$(2^{(-q+1)} + 2^{(-n+1)}) > 2^{(-q-n+2)}.$$

This proves that a larger number is substracted from 1 than is added in the expression for $P_{max}$. Thus, $P_{max} < 1$.

Using these theorems, an algorithm for forming the matrix is formulated. We first assume S bit overlapped scanning with M+1 partial products, M being equal to $$INT\left[\frac{n-1}{S-1}\right]$$

with INT being the integer division and n the length of multiplier Y. S may be determined after conducting a comparative study of the hardware and timing requirements to calculate the multiples with due consideration of the reductions of the hardware and timing of the resulting carry save adder trees.

Figure 4:
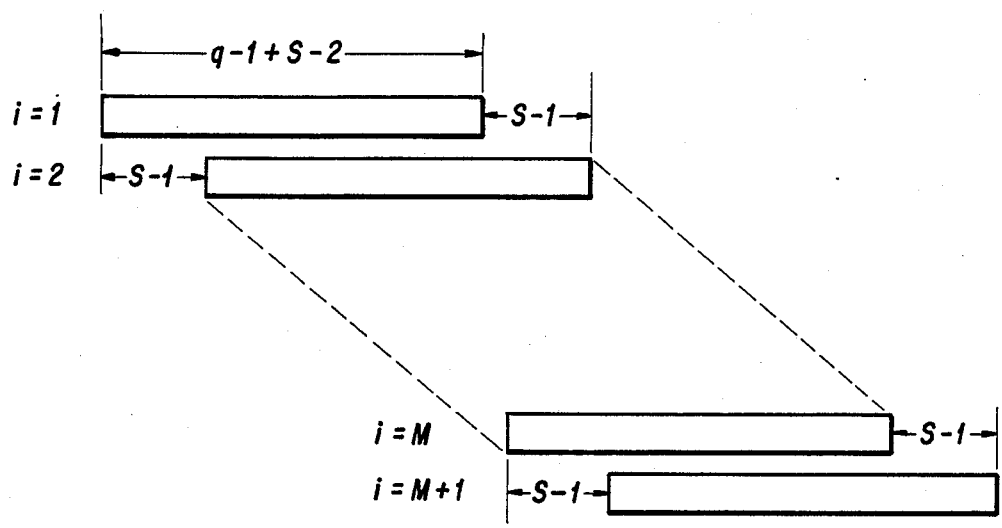
FIGS. 4-7 are schematic diagrams illustrating the formation of a matrix of the invention.

Assuming the scanning starts at the most significant bits of Y, then the multiple of the (i+1) the partial product is shifted with respect to the ith partial product by (S−1) bits to the right where is is an integer greater than or equal to 1 and less than or equal to M+1. This is illustrated in FIG. 4, where the successive partial products i=1, i=2, ..., i=M and i=M+1 are shown as rows of the matrix, each (except for the first partial product i=1) shifted to the right by S−1 bits relative to the previous row. As indicated in the figure, each partial product row has q−1+S−2 bit positions, q being the width of the multiplicand, including bit 0, with the least significant bit being the (q−1)th bit.

Figure 5:
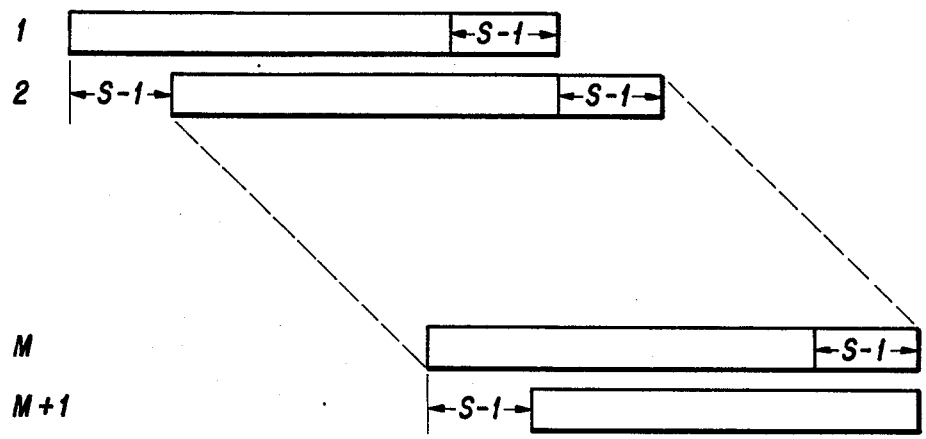

As shown in FIG. 5, in every row except the last, S−1 significant bit positions are added to the right of the partial product. These bits encode the sign of the next partial product term. Since no partial product term follows the last, the extension is not needed in the last row.

Figure 6:
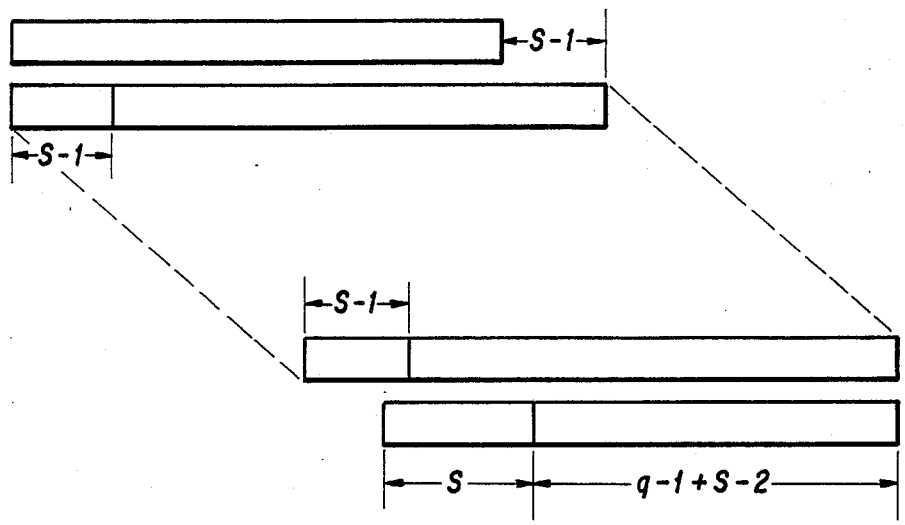

As shown in FIG. 6, S−1 significant bits are added to the left of every partial product term to encode the sign of the partial product term with the exception of the first partial product term which needs no encoded sign extension because of truncation and the last partial product term which has an encoded sign extension of S−1 plus one so that S bits are needed.

Figure 7:
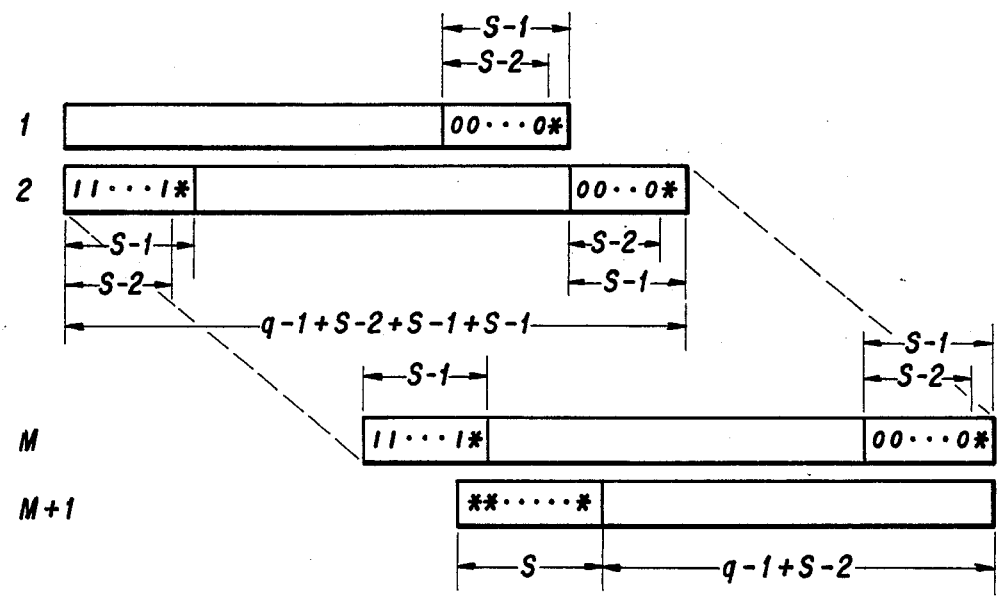

As shown in FIG. 7, 1s and 0s are placed in the matrix where known, the symbol * indicating a bit which can be either 1 or 0. As indicated, the encoded extensions to the right of the partial product are all 0s except for the last bit. According to Theorem 2, this extension signifies the need for a hot "1" to be added if the next partial product is negative. All of the bits of the extension including the last are zeros when the following term is positive, but the last significant bit is 1 when the next partial product term is negative. The encoded sign extension to the left of the partial product terms in all but the first and last rows have S−2 ones followed by *. According to Theorem 3, this encoded sign extension has S−1 ones when the partial product term is positive and S−2 ones and a zero to the right of the S−2 ones when the partial product is negative. According to Theorem 4, the S bit encoded extension to the left of the last partial product term in row M+1, is 1 followed by S−1 zeros for a positive partial product term and 0 followed by S−1 ones for a negative partial product term.

As just indicated, certain positions of the modified partial product terms will be known to always be 0 or 1. This information can be exploited to simplify the carry save adder trees. Whereas, when all three inputs to a carry save adder means of a tree are unknown, a carry save adder logic circuit is needed to perform the carry save adder function, when one or more of the three inputs are known, more simple logic, requiring less space on the chip may be used. If $K_1$, $K_2$ and $K_3$ are the three inputs to a carry save adder logic circuit, then the carry output CA and the save output SA are governed by:

$$CA = K_1K_2 + K_1K_3 + K_2K_3$$

$$SA = K_1 \oplus K_2 \oplus K_3.$$

For the case $K_3 = 0$, $$CA = K_1K_2 + K_10 + K_20 = K_1K_2$$

$$SA = K_1 \oplus K_2 \oplus 0 = K_1 \oplus K_2.$$

Figure 8:
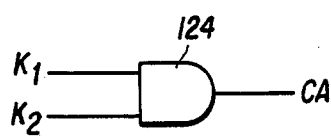
FIGS. 8-17 are schematic circuit diagrams showing simplification of stages of the carry save adder tree of the embodiment of the invention.
Figure 9:
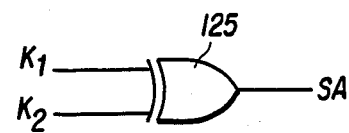

This means that CA can be obtained by a 2-way AND gate, as illustrated in FIG. 8 at 124, and that SA can be obtained by an Exclusive OR gate 125 as shown in FIG. 9.

For the case $K_3 1$, $$CA = K_1K_2 + K_11 + K_21 = K_1 + K_2$$

$$SA = K_1 \oplus K_2 \oplus 1 = \overline{K_1 \oplus K_2}.$$

Figure 10:
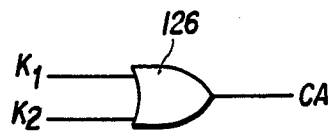
Figure 11:
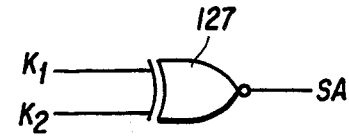

The CA term is obtained from a 2-way OR gate 126 as shown in FIG. 10, and the SA term from an Exclusive NOR gate 127 as shown in FIG. 11.

For every column which has one significant term which is unknown and two which are known, we can use:

For $(K_1, K_2) = (0,0)$ $$CA = 00 + 0K_3 + 0K_3 = 0$$

$$SA = 0 \oplus 0 \oplus K_3 = K_3.$$

Figure 12:
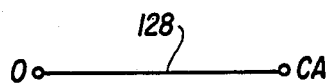
Figure 13:
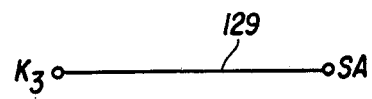

Thus, for the CA term, the CA output is hardwired at 128 to logic level 0 as shown in FIG. 12; and the SA output is hardwired at 129 to the $K_3$ input as shown in FIG. 13.

For $(K_1, K_2) = (0,1)$ or $(1,0)$ $$CA = 1 \cdot 0 + 1K_3 + 0 \cdot K_3 = K_3$$

$$SA = 1 \oplus 0 \oplus K_3 = \overline{K_3}$$

Figure 14:
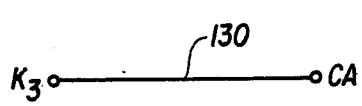
Figure 15:
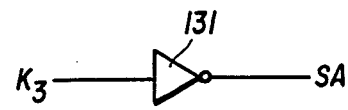

Hence, the CA output is obtained by being hardwired to the $K_3$ input as shown at 130 in FIG. 14. SA, on the other hand, is obtained from $K_3$ through an inverter 131 as shown in FIG. 15.

For $(K_1, K_2) = (1,1)$ $$CA = 1 \cdot 1 + 1K_3 + 1K_3 = 1$$

$$SA = 1 \oplus 1 \oplus K_3 = K_3$$

Figure 16:
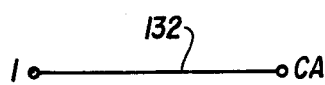
Figure 17:
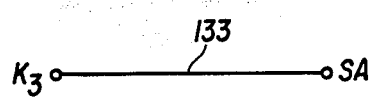

Thus, as shown in FIG. 16, output CA is hardwired at 132 to logic level 1, while output SA is hardwired to input $K_3$ as shown at 133 in FIG. 17.

For the case where all three input terms are known, the outputs CA and SA are hardwired as indicated in the following table:

| $(K_1, K_2, K_3)$ | CA | SA |
|---|---|---|
| (0,0,0) | 0 | 0 |
| (0,0,1) | 0 | 1 |
| (0,1,0) | 0 | 1 |
| (0,1,1) | 1 | 0 |

-continued

| $(K_1,K_2,K_3)$ | CA | SA |
|---|---|---|
| (1,0,0) | 0 | 1 |
| (1,0,1) | 1 | 0 |
| (1,1,0) | 1 | 0 |
| (1,1,1) | 1 | 1 |

Thus, CA and SA are hardwired to logic levels 0 or 1 in the manner illustrated in FIGS. 12 and 16.

We will now consider the decoding function of decoder 20 for the case of four-bit scanning. In two successive scans of multiplier Y, successive bits of Y, namely $Y_{(j-2)}$, $Y_{(j-1)}$, $Y_{(j)}$ and $Y_{(j+1)}$, are scanned in a given scan and successive bits $Y_{(j+1)}$, $Y_{(j+2)}$, $Y_{(j+3)}$ and $Y_{(j+4)}$ are scanned in the next scan. Code terms $S_0$ and $S_1$ are defined in these equations:

$$S_0 = Y_{(j-1)} Y_{(j)} Y_{(j+1)} + Y_{(j-1)} Y_{(j)} Y_{(j+1)} +$$
$$Y_{(j-2)} Y_{(j-1)} + Y_{(j-2)} Y_{(j-1)}$$

$$S_1 = Y_{(j-2)} Y_{(j-1)} Y_{(j)} + Y_{(j-2)} Y_{(j-1)} Y_{(j+1)} +$$
$$Y_{(j)} Y_{(j+1)} + Y_{(j)} Y_{(j+1)}.$$

Figure 18:
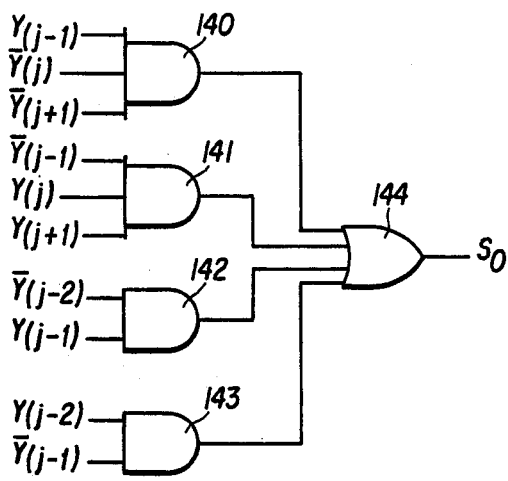
FIGS. 18-23 and 26-31 are schematic diagrams of portions of the decoder of the embodiment of the invention.
Figure 20:
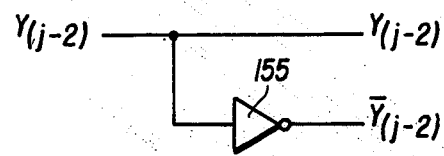
Figure 21:
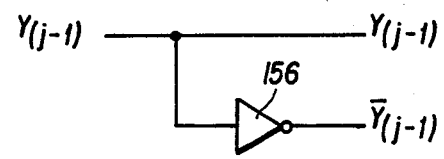
Figure 19:
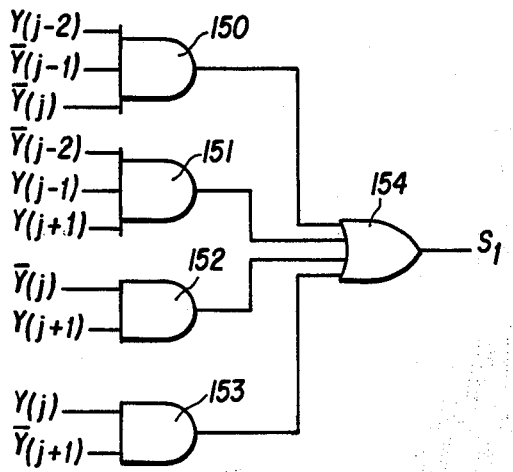
Figure 22:
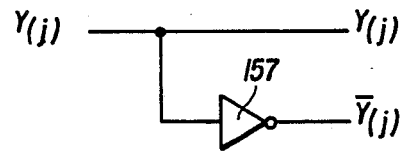
Figure 23:
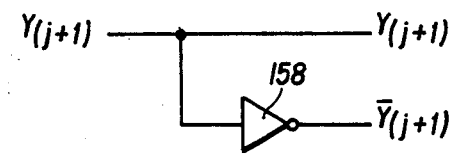

These equations translate respectively to the logic circuits of FIGS. 18 and 19. In FIG. 18, inputs corresponding to the first term of the $S_0$ equation are anded in AND gate 140; inputs corresponding to the second term of the equation are anded in AND gate 141; inputs corresponding to the third term of the equation are anded in AND gate 142; and inputs corresponding to the fourth term of the equation are anded in AND gate 143. The outputs of these AND gates provide the four inputs of OR gate 144 the output from which is $S_0$. In FIG. 19, the inputs to AND gates 150, 151, 152 and 153 correspond respectively to the terms of the equation for $S_1$. The outputs of the AND gates are the four inputs to OR gate 154, the output from which is $S_1$. As shown in FIGS. 20, 21, 22 and 23, the complementary form of $Y_{(j-2)}$, $Y_{(j-1)}$, $Y_{(j)}$ and $Y_{(j+1)}$, respectively, are obtained through inverters 155, 156, 157 and 158.

Figure 24:
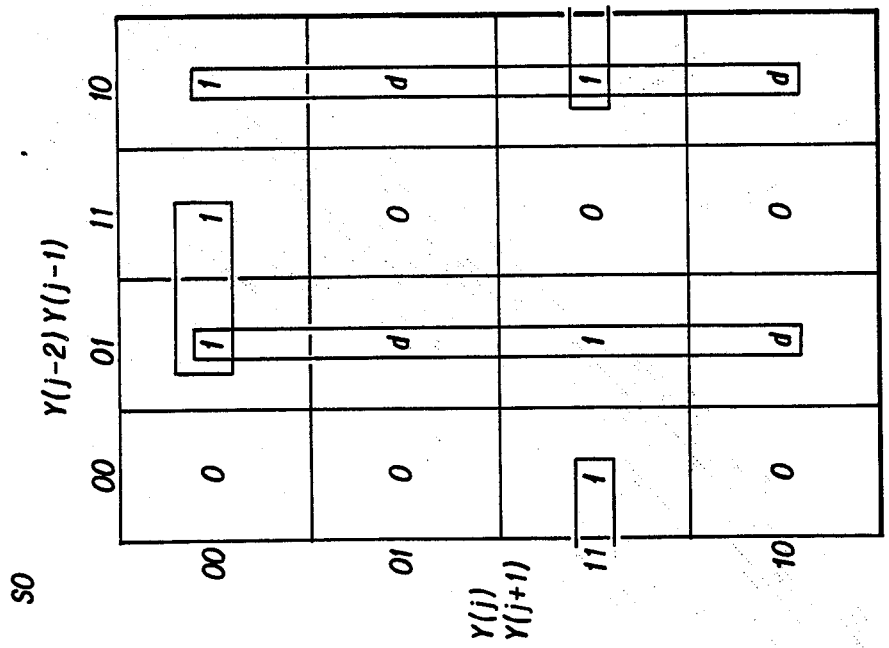
FIGS. 24 and 25 are Karnaugh diagrams illustrating the logic of the circuit diagrams of FIGS. 18 and 19.
Figure 25:
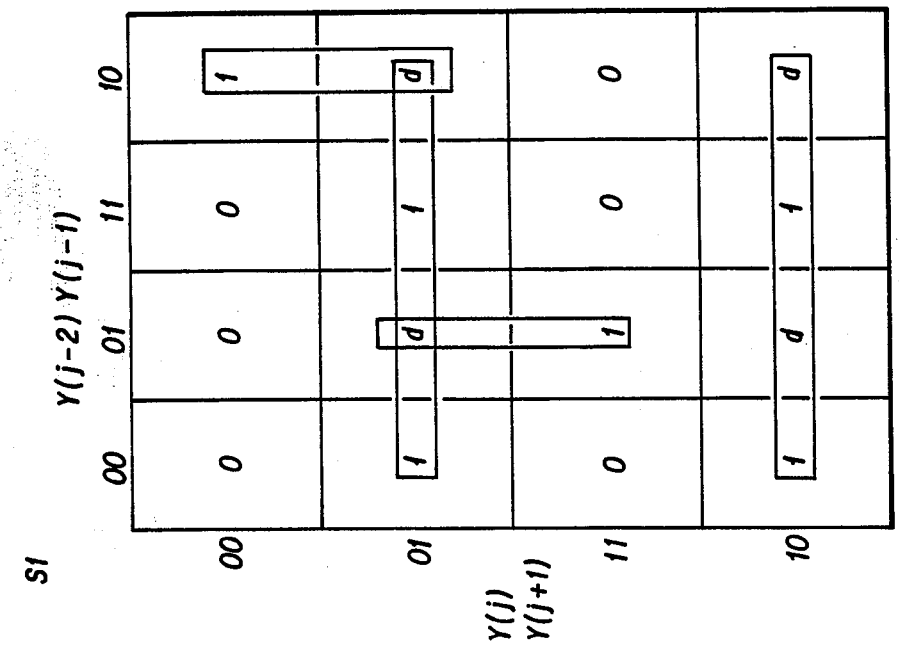

The following table gives the values of $S_0$ and $S_1$ and of the multiple coefficient W selected by multiplexor 36 in response thereto for various values of the four scanned bits:

| | | | | Encode | | |
|---|---|---|---|---|---|---|
| $Y_{(j-2)}$ | $Y_{(j-1)}$ | $Y_{(j)}$ | $Y_{(j+1)}$ | $S_0$ | $S_1$ | Coefficient W |
| 0 | 0 | 0 | 0 | 0 | 0 | 0 |
| 0 | 0 | 0 | 1 | 0 | 1 | 1 |
| 0 | 0 | 1 | 0 | 0 | 1 | 1 |
| 0 | 0 | 1 | 1 | 1 | 0 | 2 |
| 0 | 1 | 0 | 0 | 1 | 0 | 2 |
| 0 | 1 | 0 | 1 | d | d | 3 |
| 0 | 1 | 1 | 0 | d | d | 3 |
| 0 | 1 | 1 | 1 | 1 | 1 | 4 |
| 1 | 0 | 0 | 0 | 1 | 1 | −4 |
| 1 | 0 | 0 | 1 | d | d | −3 |
| 1 | 0 | 1 | 0 | d | d | −3 |
| 1 | 0 | 1 | 1 | 1 | 0 | −2 |
| 1 | 1 | 0 | 0 | 1 | 0 | −2 |
| 1 | 1 | 0 | 1 | 0 | 1 | −1 |
| 1 | 1 | 1 | 0 | 0 | 1 | −1 |
| 1 | 1 | 1 | 1 | 0 | 0 | 0 | where d is a "don't care" bit. The Karnaugh diagrams of FIGS. 24 and 25 illustrate the derivation of the values of $S_0$ and $S_1$, respectively.

Code terms $A_0$, $A_1$, $A_2$ and $A_3$ are defined in these equations:

$$A_0 = Y_{(j-2)} Y_{(j-1)} + Y_{(j-2)} Y_{(j)} Y_{(j+1)} + Y_{(j-1)} Y_{(j)} Y_{(j-1)}$$

$$A_1 = Y_{(j-2)} Y_{(j-1)} Y_{(j)} Y_{(j+1)} + Y_{(j-2)} Y_{(j-1)} Y_{(j)} Y_{(j+1)}$$

$$A_2 = Y_{(j-2)} Y_{(j-1)} Y_{(j+1)} + Y_{(j-2)} Y_{(j-1)} Y_{(j)} +$$
$$Y_{(j-2)} Y_{(j)} Y_{(j-1)} + Y_{(j-2)} Y_{(j-1)} Y_{(j)} Y_{(j+1)}$$

$$A_3 = Y_{(j-2)} Y_{(j-1)} Y_{(j)} Y_{(j+1)} + Y_{(j-2)} Y_{(j-1)} Y_{(j)} Y_{(j+1)}.$$

Figure 26:
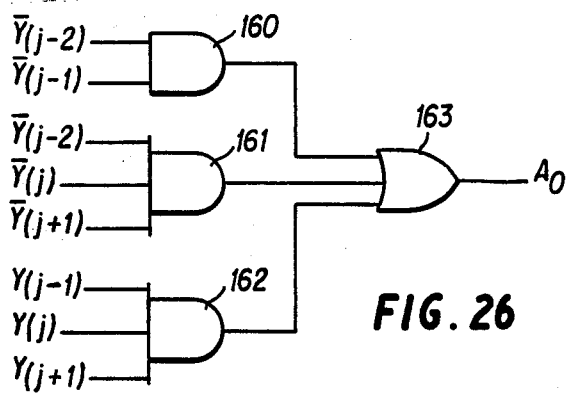
Figure 27:
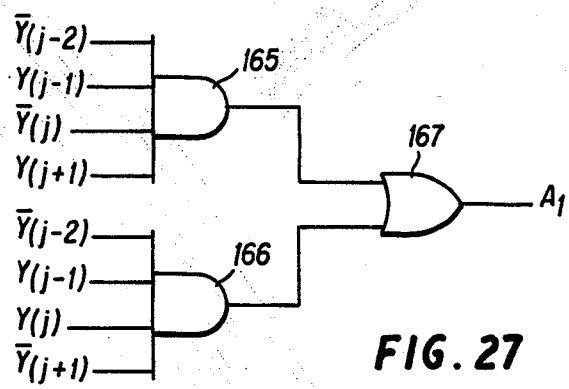
Figure 28:
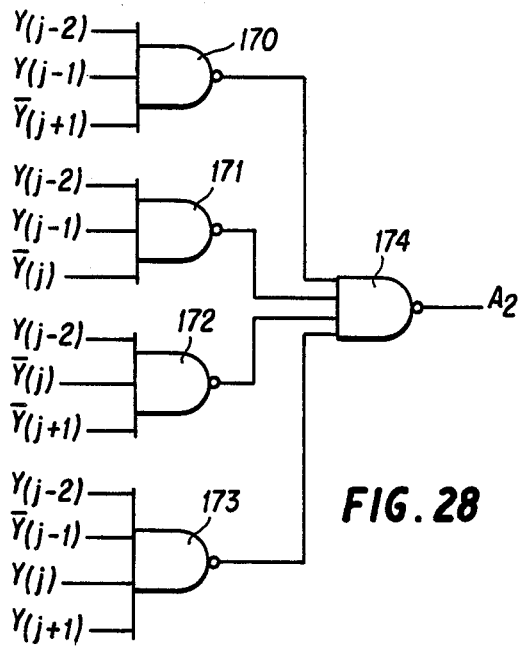
Figure 29:
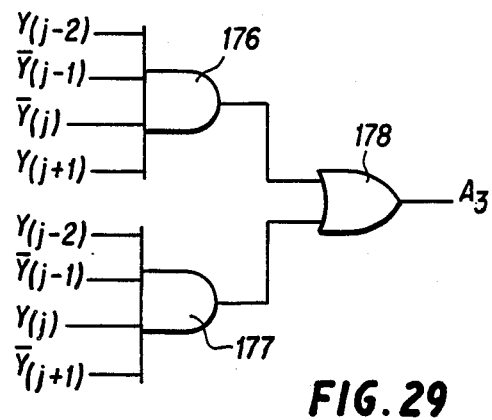

These equations translate into the logic diagrams of FIGS. 26, 27, 28 and 29, respectively. In FIG. 26, the inputs to AND gates 160, 161 and 162 correspond to the respective terms of the equation for $A_0$ with the outputs from the AND gates providing the inputs to OR gate 163, the output from which is $A_0$. In FIG. 27, AND gates 165 and 166 receive inputs corresponding to the respective terms of the equation for $A_1$. The outputs from AND gates 165 and 166 provide the inputs to OR gate 167 whose output is $A_1$. In FIG. 28, the inputs to NAND gates 170, 171, 172 and 173 correspond to the respective terms of the equation for $A_2$. The outputs from NAND gates 170, 171, 172 and 173 supply the inputs to NAND gate 174, the output from which is $A_2$. In FIG. 29, AND gates 176 and 177 receive inputs corresponding to the terms of the equation for $A_3$. The outputs from these AND gates are inputs to OR gate 178 whose output is $A_3$.

The following table gives the values of $A_0$, $A_1$, $A_2$ and $A_3$ and the coefficient W and sign selected by 2 to 1 True/Complement Selector 38 in response thereto for various values of the four scanned bits:

| | | | | Encode | | | | Coefficient |
|---|---|---|---|---|---|---|---|---|
| $Y_{(j-2)}$ | $Y_{(j-1)}$ | $Y_{(j)}$ | $Y_{(j+1)}$ | $A_0$ | $A_1$ | $A_2$ | $A_3$ | W |
| 0 | 0 | 0 | 0 | 1 | 0 | 0 | 0 | 0 |
| 0 | 0 | 0 | 1 | 1 | 0 | 0 | 0 | 1 |
| 0 | 0 | 1 | 0 | 1 | 0 | 0 | 0 | 1 |
| 0 | 0 | 1 | 1 | 1 | 0 | 0 | 0 | 2 |
| 0 | 1 | 0 | 0 | 1 | 0 | 0 | 0 | 2 |
| 0 | 1 | 0 | 1 | 0 | 1 | 0 | 0 | 3 |
| 0 | 1 | 1 | 0 | 0 | 1 | 0 | 0 | 3 |
| 0 | 1 | 1 | 1 | 1 | 0 | 0 | 0 | 4 |
| 1 | 0 | 0 | 0 | 0 | 0 | 1 | 0 | −4 |
| 1 | 0 | 0 | 1 | 0 | 0 | 0 | 1 | −3 |
| 1 | 0 | 1 | 0 | 0 | 0 | 0 | 1 | −3 |
| 1 | 0 | 1 | 1 | 0 | 0 | 1 | 0 | −2 |
| 1 | 1 | 0 | 0 | 0 | 0 | 1 | 0 | −2 |
| 1 | 1 | 0 | 1 | 0 | 0 | 1 | 0 | −1 |
| 1 | 1 | 1 | 0 | 0 | 0 | 1 | 0 | −1 |
| 1 | 1 | 1 | 1 | 1 | 0 | 0 | 0 | 0 |

The equations for code terms $R_0$ and $R_1$ are:

$$R_0 = Y_{(j-2)} (\overline{Y_{(j-1)} Y_{(j)} Y_{(j+1)}})$$

$$R_1 = Y_{(j+1)} (\overline{Y_{(j+2)} Y_{(j+3)} Y_{(j+4)}}).$$

Thus, $R_0$ is dependent on the current scan, while $R_1$ is dependent on the next scan, where "current scan" refers to the scan corresponding to the partial product whose boundary bits are being selected.

Figure 30:
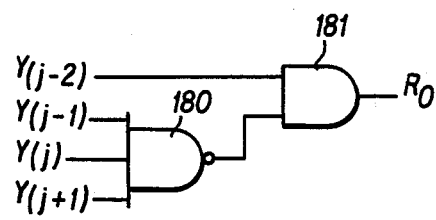
Figure 31:
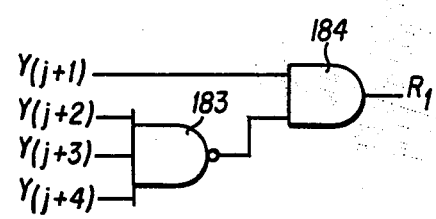

The equations for $R_0$ and $R_1$ translate into the logic diagrams of FIGS. 30 and 31, respectively. In FIG. 30, a NAND gate 180 receives bits $Y_{(j-1)}$, $Y_{(j)}$ and $Y_{(j-1)}$ as inputs and provides from its output one input to AND gate 181. The other input to AND gate 181 receives bit $Y_{(j-2)}$. $R_0$ is the output from AND gate 181. In FIG. 31

NAND gate 183 receives bits $Y_{(j+2)}$, $Y_{(j+3)}$ and $Y_{(j+3)}$ as inputs and provides an input to AND gate 184, the other input to which is bit $Y_{(j+1)}$. The output from AND gate 184 is $R_1$.

If $R_0 = 1$, boundary bits 110 from boundary bit computer 40 are appended as an encoded sign extension to the left of the partial product. If $R_0 = 0$, boundary bits 111 are appended as an encoded sign extension to the left of the partial product. If $R_1 = 0$, boundary bits 000 are appended as an encoded extension to the right of the partial product. If $R_1 = 1$, boundary bits 001 are appended to the right of the partial product.

We will now consider a particular implementation in which each partial product term has fifty-eight "middle" bits—that is, fifty-eight bits before the addition of any boundary bits. FIG. 32 shows how 2 to 1 True/Complement Select circuit 38 of FIG. 2 selects the fifty-eight middle bits of all of the partial product terms, except the first. Inputs $A_{0k}$, $A_{1k}$, $A_{2k}$ and $A_{3k}$ are the $A_0$, $A_1$, $A_2$ and $A_3$ code terms for the kth partial product term; inputs $MUX_0 \ldots MUX_{57}$ are the 0th through 57th bits of the multiple (0, X, 2X or 4X) selected by multiplexor 36 of FIG. 2 and applied from a multiplexor register; and $3X_0 \ldots 3X_{57}$ are the 0th through 57th bits of the 3X multiple received from difficult products calculator 12 of FIG. 1 and applied from a difficult products register. Inputs $A_{1k}$ and $A_{3k}$ are applied to OR gate 190, and inputs $A_{0k}$ and $A_{2k}$ are applied to OR gate 192. The output from OR gate 192 provides inputs to AND gates $194_0 \ldots 194_{57}$, the other inputs to which are inputs $MUX_0 \ldots MUX_{57}$. Thus, when the output of OR gate 192 is at level "1" and the MUX bit is a "1", the corresponding AND gate output is at level "1". Likewise, the output from OR gate 190 is applied as inputs to AND gates $196_0 \ldots 196_{57}$, the other inputs to which are bits $3X_0 \ldots 3X_{57}$. The outputs of AND gates 196 also are at level "1" when the output from OR gate 190 is at level "1" and the 3X bit is at level "1", the output from the AND gate 196 is at level "1". The outputs from AND gates $194_0$ and $196_0$, ... $194_{57}$ and $196_{57}$ are applied respectively to OR gates $198_0 \ldots 198_{57}$. As a result, the outputs from OR gates $198_0 \ldots 198_{57}$ will correspond to the values of the bits of the multiplexor output, if the output from OR gate 192 is at level "1", and will correspond to the bit values of 3X, if the output from OR gate 190 is at level "1".

If either $A_{2k}$ or $A_{3k}$ are at level "1", the partial product is negative and needs to be complemented. This is achieved by applying $A_{2k}$ and $A_{3k}$ as inputs to OR gate 200. The output from OR gate 200 is applied as inputs to Exclusive OR gates $202_0 \ldots 202_{57}$, the other inputs to which are the outputs from OR gates $198_0 \ldots 198_{57}$, respectively. Thus, the output from OR gate 200 selects the complement of the outputs from OR gates $198_0 \ldots 198_{57}$ when the output from OR gate 200 is at level "1". The outputs from Exclusive OR gates $202_0 \ldots 202_{57}$ then become the middle 58 bits of the kth partial product term.

The portion of 2 to 1 True/Complement Select circuit 38 dedicated to the first partial product term is simplified as shown in FIG. 33. Since the first partial product will always be positive or zero as explained above, there is no need to invert the bits of the partial product when the partial product is negative. Accordingly, the portion of the circuit for selecting the complement is omitted. Code term $A_{01}$ is applied as an input to AND gates $204_0 \ldots 205_{57}$, and code term $A_{11}$ is applied to AND gates $205_0 \ldots 205_{57}$. The outputs $MUX_0 \ldots MUX_{57}$ from multiplexor 36 of FIG. 2 are applied to the other inputs of AND gates $204_0 \ldots 204_{57}$. Likewise, the outputs $3X_0 \ldots 3X_{57}$ from difficult products calculator of FIG. 1 are applied to the other inputs to AND gates $205_0 \ldots 205_{57}$. The outputs from AND gates $204_0$ and $205_0 \ldots 205_{57}$ and $205_{57}$ are applied respectively to OR gates $206_0 \ldots 206_{57}$, the outputs from which constitute the fifty-eight middle bits of the first partial product. These bits will correspond to the bits of the multiplexor output when $A_{01}$ is at level "1" and to the bit values of 3X when $A_{11}$ is at level "1".

Figure 34:
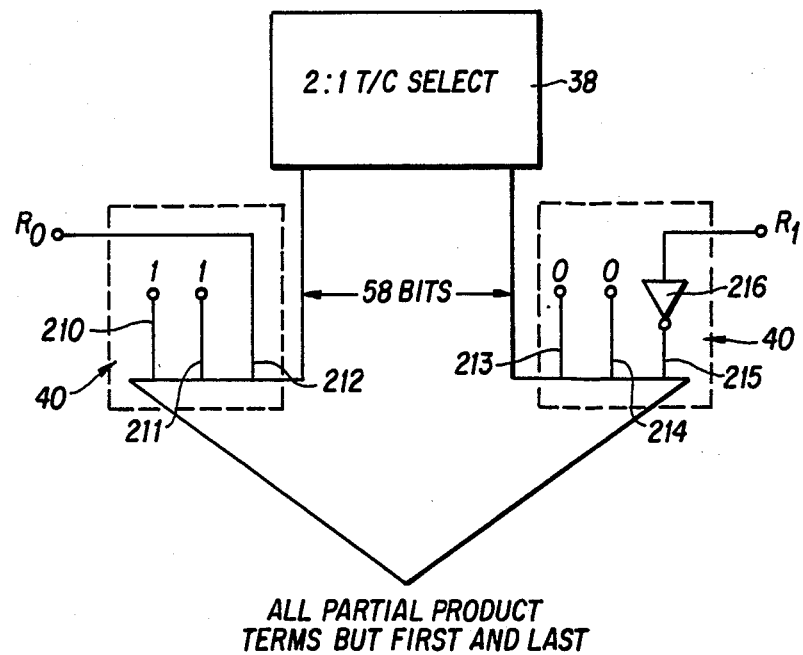

The manner in which Compute Boundary Bits circuit 40 operates to append boundary bits on the left and right ends of all but the first and last of the partial product terms generated by 2:1 True/Complement Select circuit 38 is shown in FIG. 34. As already described, for all partial product terms except the first and last, $S-1$ bits are appended to the left of the partial product term. If the partial product term is positive, the encoding is $S-1$ ones; and if negative, the encoding is $S-2$ ones followed by a zero. In the example illustrated, $S=4$, and $S-1=3$. Since the first two bits are always "1", bit lines 210 and 211 are hardwired to logic level "1". Bit line 212 is connected to receive code term $R_0$. When the partial product term is positive, $R_0$ is at level "1" and bit line 212 is at level "1". When, however, the partial product term is negative, $R_0$ is at level "0" and bit line 212 is at level "0".

It has also been explained that $S-1$ bits are appended to the right for all partial product terms except the last partial product term. These bits are all zeros, if the following term is positive. If, however, the following term is negative, the bits appended to the right of the partial product term are $S-2$ zeros followed by a one. Since in the example shown $S=4$ and $S-1=3$, the first two bit lines 213 and 214 to the right of the partial product term are hardwired to logic level "0". The last bit line 215 is responsive to the sign of the next partial product term as signified by code term $R_1$. Code term $R_1$ is applied to bit line 215 through inverter 216. Thus, when $R_1$ is at level "1", indicating that the next term is positive, logic level "0" is applied to bit line 215. If, on the other hand, $R_1$ is at level "0", indicating that the next term is negative, logic level "1" is applied to bit line 215.

As a result, the partial product term is modified with three bits appended at its left end and three bits appended at its right end. This modified partial product term now constitutes a row, other than the first or last row, of the matrix.

Figure 35:
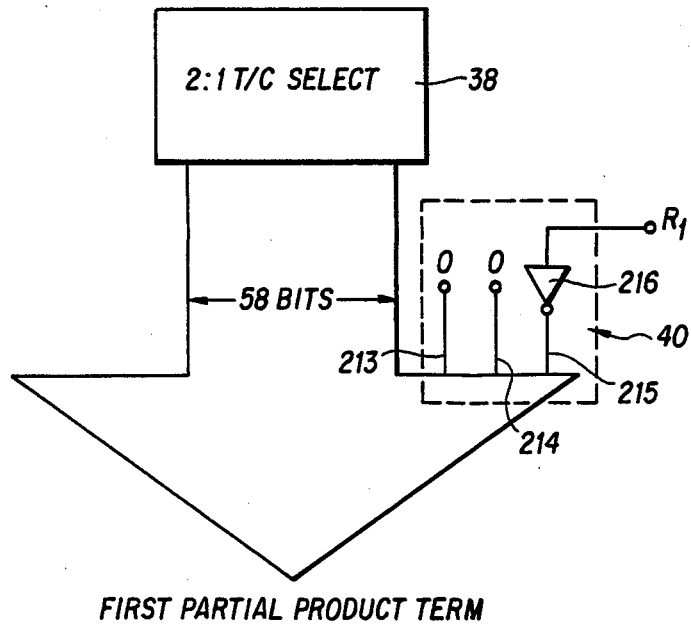

As shown in FIG. 35, in the case of the first partial product term which has, as has been explained, no boundary bits appended to its left end, the portion of boundary bit circuit 40 at the left end of the partial product term is omitted. Since boundary bits are still appended at the right end of the first partial product term, this portion of circuit 40 is identical to that used for all partial product terms but the first and last as shown in FIG. 34.

Figure 36:
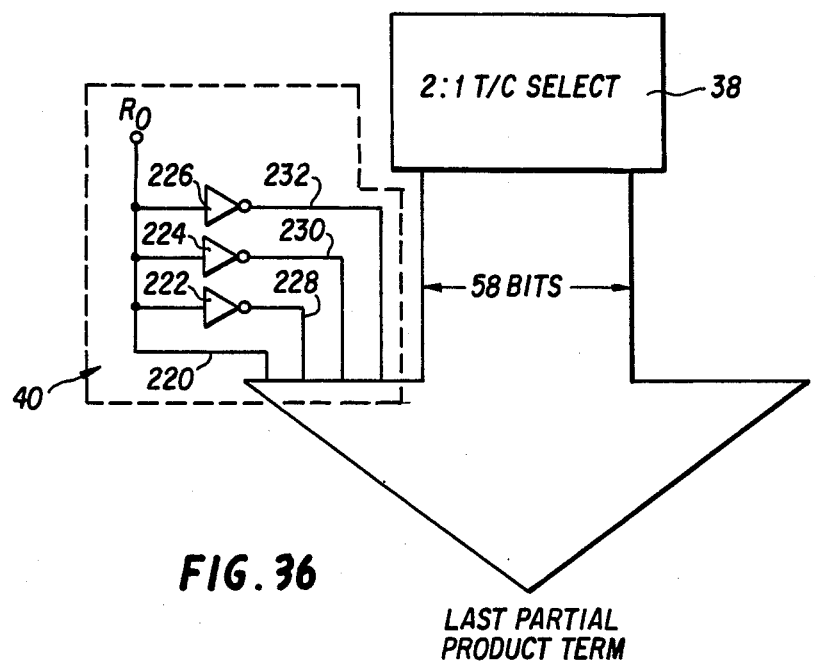
FIGS. 34-36 are schematic circuit diagrams showing how portions of the Boundary Bit Computer of the embodiment of the invention append boundary bits to partial product terms.

In the case of the last partial product term, as shown in FIG. 36, no boundary bits are appended at the right end of the partial product term. At the left end, however, four bits are appended. Line 220 applied the value of code term $R_0$ as the first of these bits. Code term $R_0$ is also applied through inverters 222, 224 and 226 to lines 228, 230 and 232 forming the second, third and fourth bits of the four bit extension. Thus, when $R_0$ is at level "0", the first bit is at level "0" followed by three bits at level "1"; and when $R_0$ is at level "1", the first bit is at level "1" followed by three bits at level "0".

We shall now consider in detail the particular case of an embodiment in which $S=4$, $q-1=56$ and $n-1=56$. The following table shows the partial product terms obtained for various values of the four scanned bits:

| $Y_{(j-2)}$ | $Y_{(j-1)}$ | $Y_{(j)}$ | $Y_{(j+1)}$ | Partial Product Term |
|---|---|---|---|---|
| 0 | 0 | 0 | 0 | $1 \times 2^{(-j)}$ |
| 0 | 0 | 0 | 1 | $1 \times 2^{(-j)}$ |
| 0 | 0 | 1 | 1 | $2 \times 2^{(-j)}$ |
| 0 | 1 | 0 | 0 | $2 \times 2^{(-j)}$ |
| 0 | 1 | 0 | 1 | $3 \times 2^{(-j)}$ |
| 0 | 1 | 1 | 0 | $3 \times 2^{(-j)}$ |
| 0 | 1 | 1 | 1 | $4 \times 2^{(-j)}$ |
| 1 | 0 | 0 | 0 | $-4 \times 2^{(-j)}$ |
| 1 | 0 | 0 | 1 | $-3 \times 2^{(-j)}$ |
| 1 | 0 | 1 | 0 | $-3 \times 2^{(-j)}$ |
| 1 | 0 | 1 | 1 | $-2 \times 2^{(-j)}$ |
| 1 | 1 | 0 | 0 | $-2 \times 2^{(-j)}$ |
| 1 | 1 | 0 | 1 | $-1 \times 2^{(-j)}$ |
| 1 | 1 | 1 | 0 | $-1 \times 2^{(-j)}$ |
| 1 | 1 | 1 | 1 | 0 |

In this particular implementation, the fraction is 56-bits in length. Thus, 19 partial product terms are created after 4-bit scanning as is detailed below:

```
                111 111 111 122 222 222 223 333 333 333 444 444 444 455 555 55
       0123 456 789 012 345 678 901 234 567 890 123 456 789 012 345 678 901 234 56F
       | 1 | 2 | 3 | 4 | 5 | 6 | 7 | 8 | 9 | 10 | 11 | 12 | 13 | 14 | 15 | 16 | 17 | 18 | 19
```

The numbers 0 through 56 represent bit positions of the multiplier Y. Bit position $Y_0$ is the sign which is forced to zero; and bit F is also forced to zero. Bit F must be zero, because of a requirement in multi-bit overlapped scanning multiplication that the last scan must end in zero. Each of the vertical lines indicate the bits scanned in each scan: for example, the first scan covers bits $Y_0$ through $Y_3$, the second scan covers bits $Y_3$ through $Y_6$ and so on. The numerals between the vertical lines are the number of the scan, there being 19 scans and, hence, 19 partial product terms.

As has already been explained, to create a matrix, the partial product terms in all rows except the first and last are appended with a few bits so as to make them uniform in length and displacement from each other which makes the matrix banded.

First, the multiples are represented as 58 bits which is $q-1+S-2$. The negative multiples are represented in one's complement plus a hot "1". The multiples with less than 58 significant bits are sign-extended to 58 bits.

Second, three bits ($S-1=4-1=3$) are added to the right of every term (except the last term) to account for representing the negative multiples as one's complement numbers rather than two's complement numbers. This is done by appending 001 to right of terms followed by a negative term, and 000 is appended to terms followed by a positive term.

Third, three bits are appended to the left of every term except the first and last. This is done to extend the sign of any negative terms. These three bits are 111 for positive terms and 110 for negative terms. The last form has an S-bit encoding which is 0111 if it is negative and 1000 if it is positive.

Figure 37:
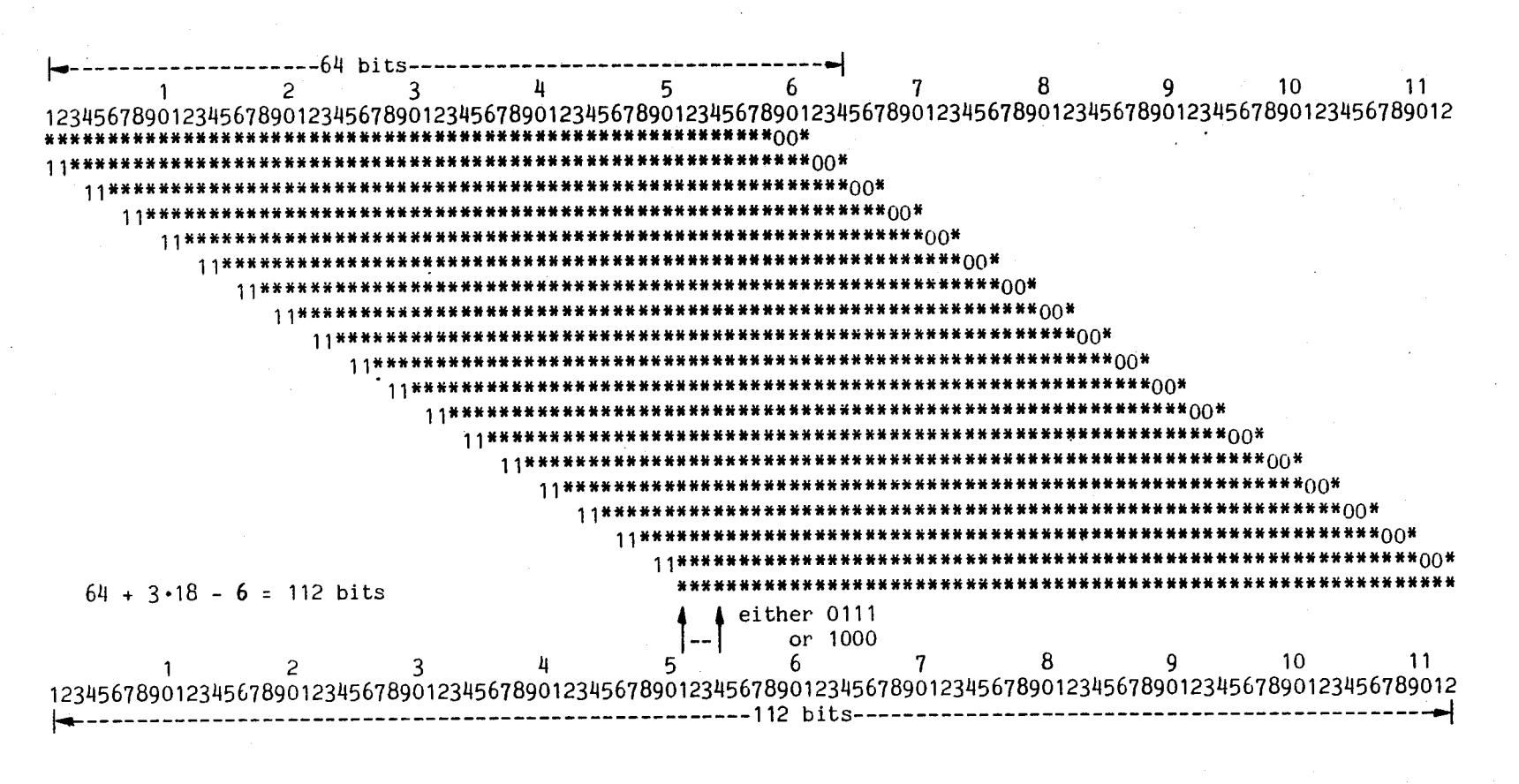

Thus, a band matrix is formed with the first term having 61 significant bits, the next 17 terms having 64 significant bits, and the last term having 62 significant bits. The completed matrix is shown in FIG. 37. The partial product terms of successive scans are shifted three spaces ($S-1=3$) to the right. Since the partial product term in the first row has no three bit sign extension on the left, the first and second rows begin in the same column. Because the last partial product term has no three bit extension on the right, the last and next to last rows end in the same column. Also, since the last row is extended four bits on the left, the last row begins two columns to the right of the next to last row.

Figure 38:
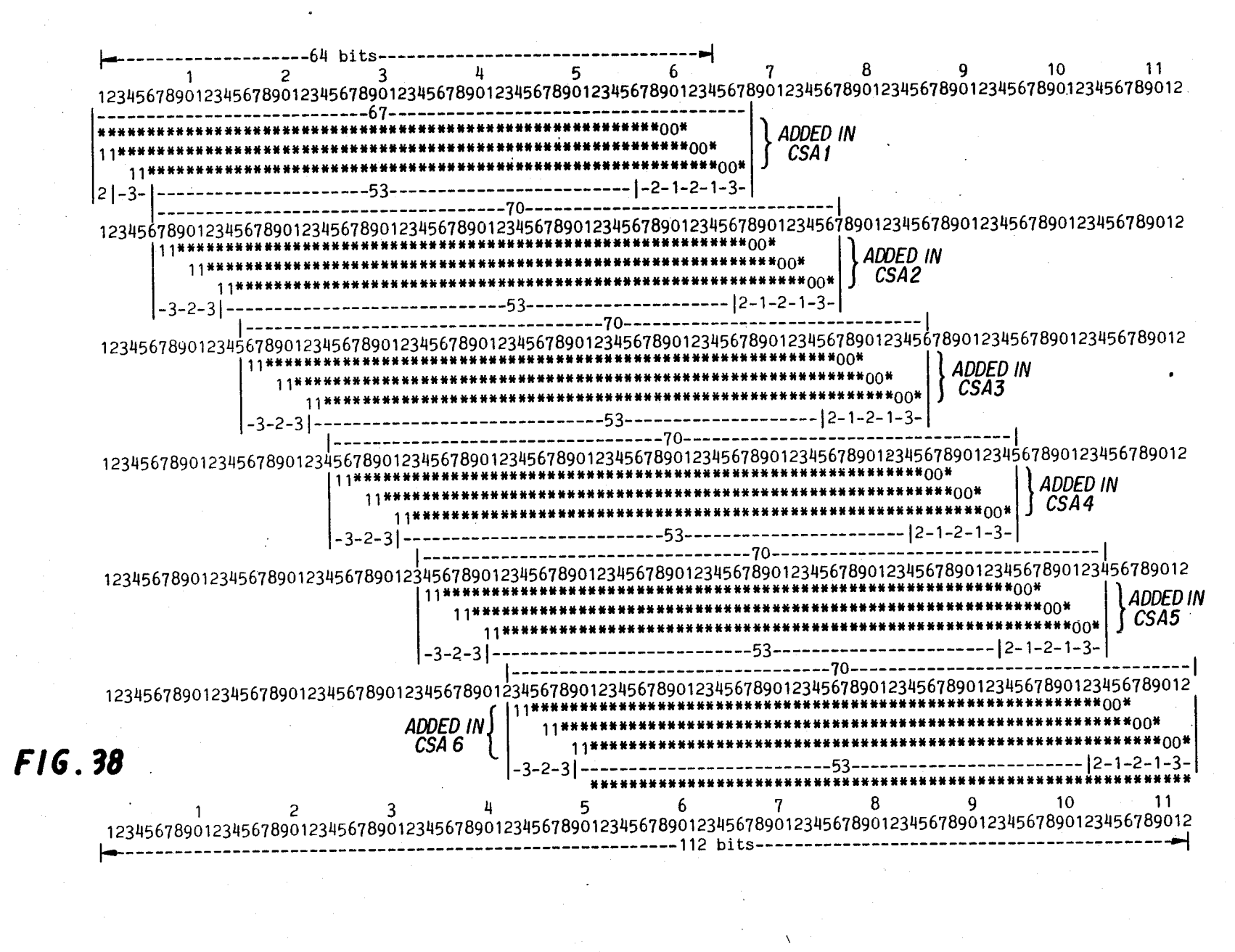

We shall next consider in detail the reduction of this matrix using the carry save adder trees. Turning to FIG. 38, the matrix is divided into six sets of three rows plus a seventh set having one row. The first six sets are then processed in the first stages CSA1, CSA2, CSA3, CSA4, CSA5 and CSA6 of the carry save adder tree.

Figure 39:
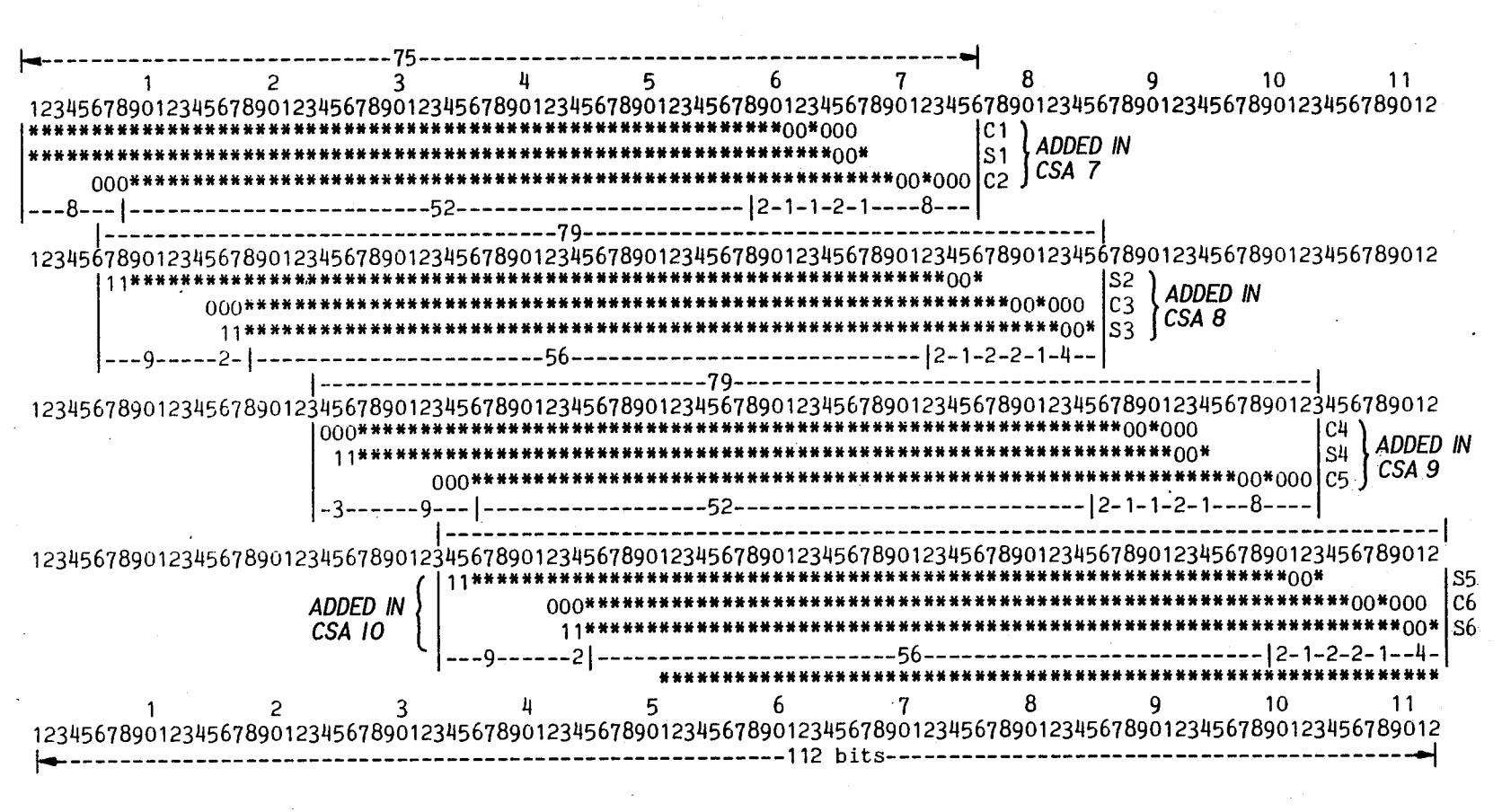

In the second stage of the carry save adder tree, the matrix of partial product terms shown in FIG. 39 must be added. The designations C1, S1, C2, S2, C3, S3, C4, S4, C5, S5, C6, S6 indicate the carry and save outputs form the carry save adders of the first stage of the tree as shown in FIG. 3. There are now four sets of three rows each, which are added in carry save adder CSA7, CSA8, CSA9 and CSA10 of the second stage of the tree.

Figure 40:
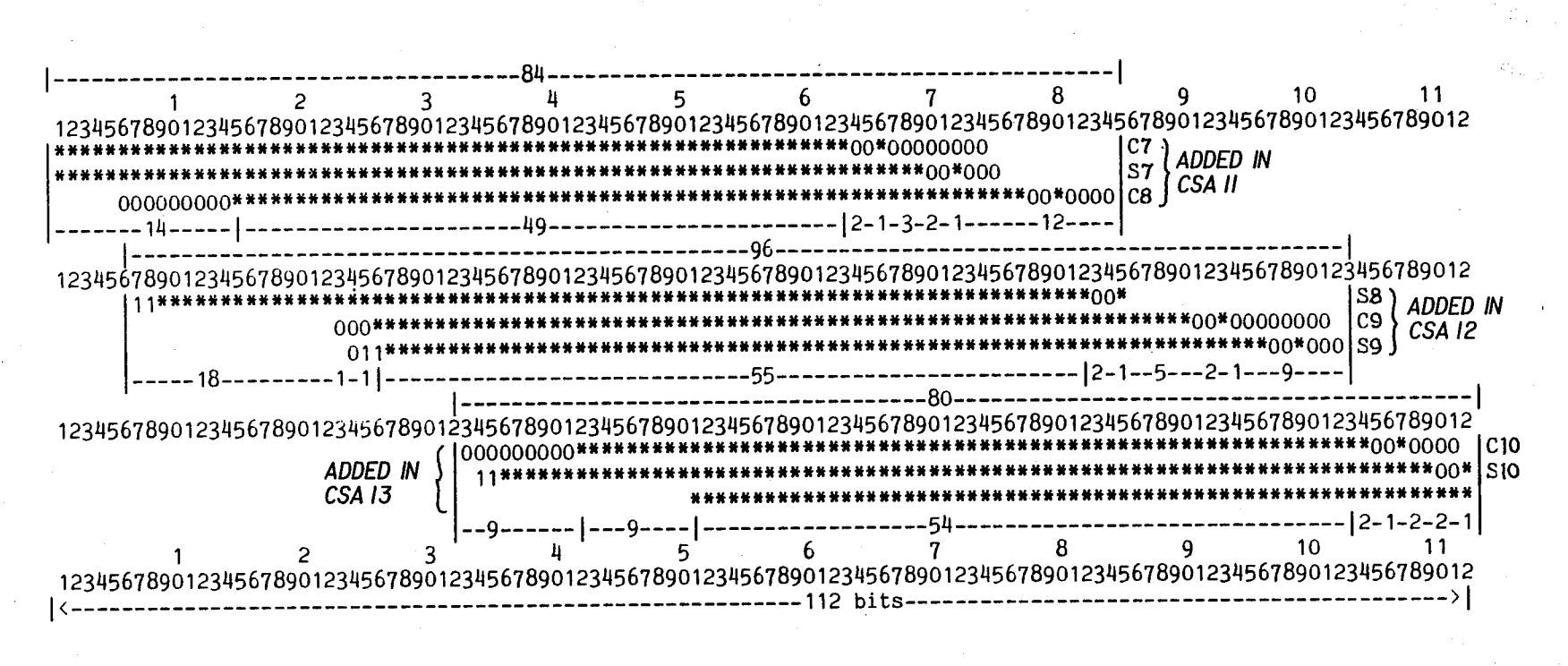

The third stage of the carry save adder tree add the matrix as shown in FIG. 40. There are now three sets of three inputs to carry save adders CSA11, CSA12 and CSA13. The sources of the rows are indicated on the right end of the rows. The last row of the third set to be added in CSA13 is row 19 from the original matrix.

Figure 41:
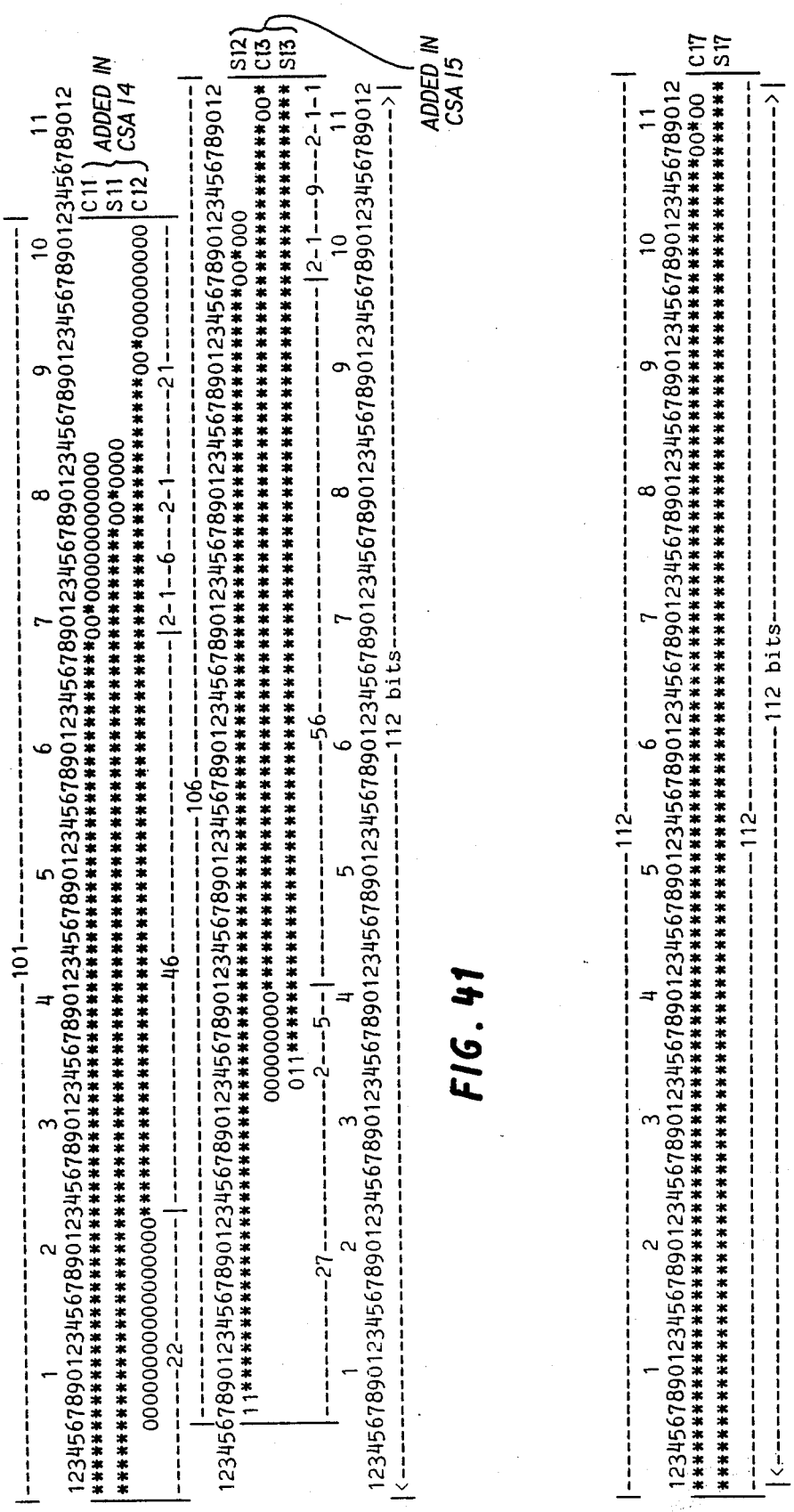
FIG. 41 is a diagram showing the rows to be added in the particular implementation in the fourth stage of the carry save adder tree.

The fourth stage of the carry save adder tree deals with the matrix shown in FIG. 41. There are now only two sets of inputs left as indicated, and these are added in carry save adders CSA14 and CSA15.

Figures 42, 43:
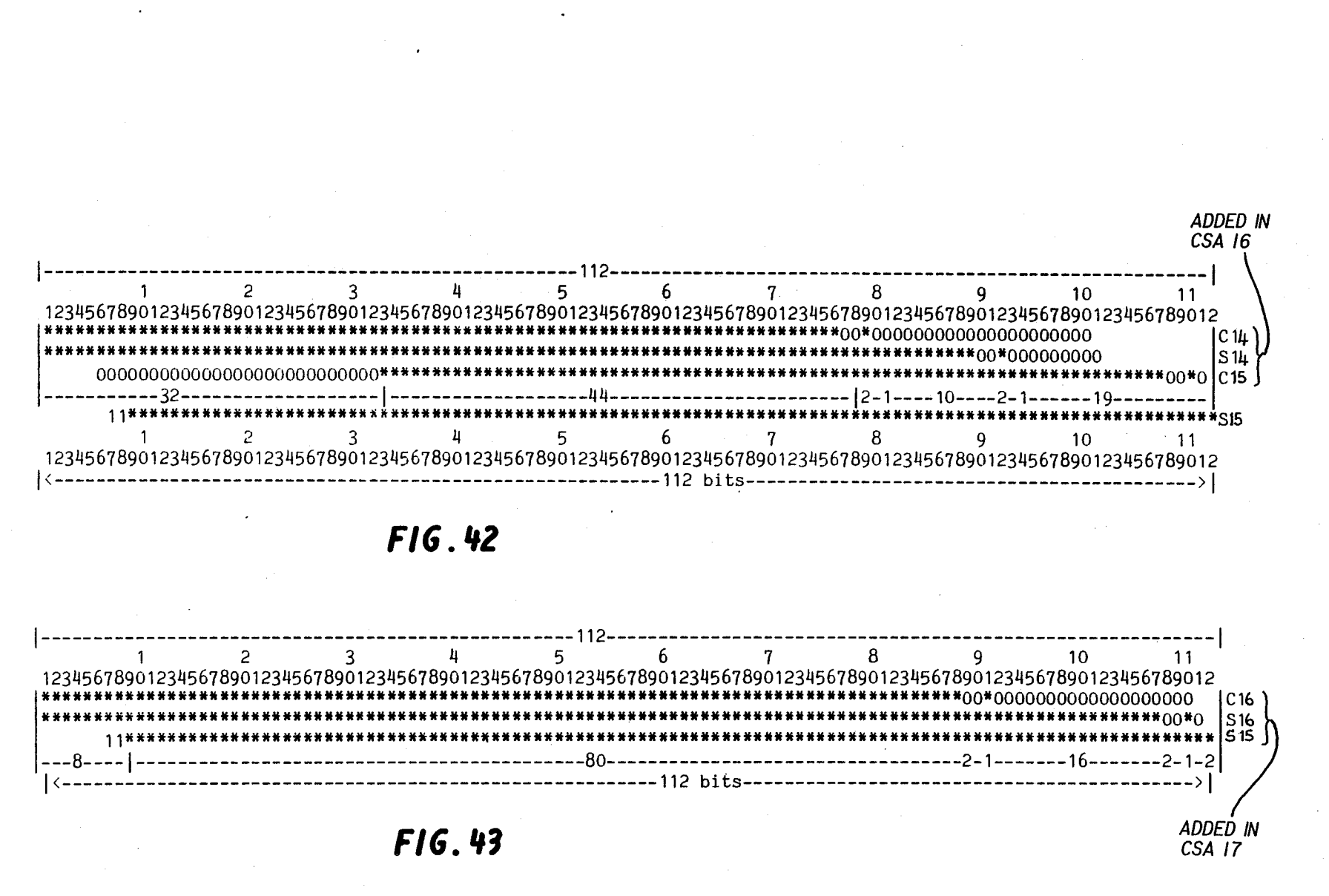

As shown in FIG. 42, the matrix is now reduced to four rows of partial product terms. The fifth stage of the carry save adder tree, consisting of carry save adder CSA16, now must add only a single set of three inputs. As indicated, the outputs C14, S14 and C15 are the sources of these inputs. An extra row derived from output S15 is saved for the sixth stage of the tree as shown in FIG. 43. The final three rows of partial product terms of the matrix are added in carry save adder CSA17.

The sum and carry output from CSA17 has the structure shown in FIG. 44, the two rows being the outputs C17 and S17 of carry save adder CA17.

If register 25 is to be placed after carry save adder tree 24 and before 2-input adder 26, it should be observed that the first row need store only 107 bits, since the other five bits can be hardwired; and places for 112 bits are needed for the second row. The 2-bit adder need be only 109 bits wide, because the least significant three bits are equal to the three least significant bits of the second term. The simplifications of the carry save adders in the carry save adder tree are also employed to reduce the hardware requirements. Thus, the hardware for the carry save adder tree can be reduced to a circuit count which is reasonable to implement on a CMOS chip, while taking less than a machine cycle (for a machine with a cycle greater than 11ns).

It should be noted that the above describes a simplified reduction of the carry save adder tree; but if further cell count reduction is required, an additional complexity can be added to achieve fewer cells. To do this, one must first check out the requirement for each stage of reduction, such as in the first stage of this implementation a reduction of 19 to 13 is required. Instead of reducing all bits of the partial products, only the bits which are in a column which will have more than 13 terms, if the column is not reduced, need be reduced on the first level. To calculate this out is easiest done on each particular implementation than for the general case, since not only does one have to consider the number of significant bits in a column but also the carries that will be generated into it. On the first level of this implementation the first 24 columns contain at most 9 significant bits and at most 3 carries will be rippled into them, thus giving a total of 12 which is less than the needed reduction to 13 significant bits per column. In addition to this, the columns with from 18 to 19 bits need only be reduced to 13 remaining bits rather than as much as possible. This can be applied for each level, noting the needed reduction and thus save additional cells. It is suggested that a designer first describe his model in the simplified method to determine the needed reduction of each level and to reduce the significant bits; after this, then, more cells can be shaved off by eliminating some of the nonessential carry save adders on the ends of the matrix. However, even the simplified reduction is a big improvement over the prior art.

A multiplier of the invention has been implemented as a two-cycle system. In the first cycle, the overlapped multi-bit scanning of the multiplier, the selection of the multiples of the multiplicand, the formation of the non-rectangular banded matrix and the addition of the matrix with carry save adder tree are effected. In the second cycle, the two to one addition is performed.

While the invention has been shown and described with respect to a preferred embodiment thereof, it will be understood by those skilled in the art that various changes in form and detail may be made therein without departing from the spirit and scope of the invention.

We claim:

1. In a system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:
   overlapped scanning means for scanning said multiplier with S successive bits at a time, each scan overlapping one of the bits of the previous scan, wherein S is greater than three;
   assembly means responsive to said successive scanned bits to select and encode modified partial products of said multiplicand for assembly in a plurality of rows of a banded partial product matrix, said partial products having $q-1+S-2$ bit positions, where q is the width of the significant bits plus the sign of said multiplicand in binary two's complement form which includes bit 0 with the least significant bit bit being the $(q-1)$th bit; and
   means for adding said modified partial products in parallel.

2. In a system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:
   overlapped scanning means for scanning said multiplier with S successive bits at a time, each scan overlapping one of the bits of the previous scan, wherein S is greater than three;
   assembly means responsive to said successive scanned bits to select and encode modified partial products of said multiplicand for assembly in a plurality of rows of a banded partial product matrix, said assembly means providing all but the first of said modified partial products with encoded sign extensions; and
   means for adding said modified partial products in parallel.

3. In a system as recited in claim 2, wherein said assembly means inverts the bits of any modified partial product whose sign is negative and appends an encoded hot "1" extension to the partial product in the previous row.

4. In a system as recited in claim 3, further comprising means for forcing the first bit of said multiplier to zero, whereby the first partial product will always be either zero or positive to avoid the need for a hot "1", there being no previous row.

5. In a system as recited in claim 3, wherein each row except the last contains a coded sign extension of $S-1$ bit positions appended to the right of said partial product, if the partial product in a given row is positive, said $S-1$ bit positions appended to the previous row being "0" bits and if the partial product in said given row is negative, said $S-1$ bit positions appended to said previous row being $S-2$ "0" bits followed by a "1" bit.

6. In the system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:
   overlapped scanning means for scanning said multiplier with S successive bits at a time, each scan overlapping one of the bits of the previous scan, wherein S is greater than three;
   assembly means responsive to said successive scanned bits to select and encode modified partial products of said multiplicand for assembly in a plurality of rows of a banded partial matrix, said partial products being modified by adding $S-2+2(S-1)$ bits; and
   means for adding said modified partial products in parallel.

7. In the system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:
   overlapped scanning means for scanning said multiplier with S successive bits at a time, each scan overlapping one of the bits of the previous scan, wherein S is greater than three;
   assembly means responsive to said successive scanned bits to select and encode modified partial products of said multiplicand for assembly in a plurality of rows of a banded partial matrix, all but the first of said modified partial products having encoded sign extensions, and wherein, in all rows but the first and last row, if said partial product is positive, said partial product having an encoded sign extension of (S−1) "1" bits and, if said partial product is negative, said partial product having (S−2) "1" bits followed by a "0" bit in the (S−1)st position; and means for adding said modified partial products in parallel.

8. In a system as recited in claim 7, wherein in said last row said encoded sign extension comprises S bits, and wherein if said partial product is positive, comprises a "1" bit followed by S−1 "0" bits, and if said partial product is negative, comprises a "1" bit followed by S−1 bits.

9. In the system as recited in claim 7, wherein said coded sign extensions are appended to the left of said partial products.

10. In a system as recited in claim 7, wherein the last row contains a coded extension to the left of S bits.

11. In a system as recited in claim 7, wherein with the exception of the first and last rows, each row contains coded extensions on the left of S−1 bits and on the right of S−1 bits, and contains q+3S−5 bit positions.

12. In a system as recited in claim 7, wherein the first row contains a coded extension to the right of S−1 bits.

13. In a system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:

overlapped scanning means for scanning said multiplier with S successive bits at a time, each scan overlapping one of the bits of the previous scan, wherein S is greater than three;

assembly means responsive to said successive scanned bits to select and encode modified partial products of said multiplicand for assembly in a plurality of rows of a banded partial product matrix; and means for adding said modified partial products in parallel, said means for adding the modified partial products comprising a carry save adder tree for each column of said matrix.

14. A system as recited in claim 13, wherein said means for adding said partial products further comprises two to one addition means for adding the results produced by said carry save adder trees.

15. In a system as recited in claim 13, wherein each carry save adder tree comprises a plurality of carry save adder logic means, each receiving three inputs, and wherein when all the three inputs of a carry save adder means are unknown, said carry save adder means being a carry save adder logic circuit, and wherein when at least one of the three inputs of a carry save adder means is known, said carry save adder means being simplified logic means.

16. In a system as recited in claim 15, wherein when all three inputs to a carry save adder means are known to be "0", the carry and save outputs of the carry save adder means are hardwired by being tied down to "0"; when two of the three inputs are known to be "0" and the other input is know to be "1", the carry output is tied down to "0" and the save output is tied to "1"; when two of the inputs are known to be "1", the carry output is tied up to "1" and the save output is tied down to "0"; and when all of the inputs are known to be "1", the carry and save outputs are tied up to "1".

17. In a system as recited in claim 15, wherein when one of said inputs to a carry save adder means is known to be "0" and the other inputs are unknown, said carry save adder means comprises a 2-way AND gate for the carry output and a 2-way Exclusive OR gate for the save output and wherein when said one of said inputs is known to be "1" and the other inputs to a said carry save adder means are unknown, said carry save adder means comprises a 2-way OR gate for the carry output and a 2-way Exclusive NOR gate for the save output.

18. In a system as recited in claim 15, wherein when two of said inputs to a carry save adder means are known to be "0" and one input is unknown, said carry save adder means comprises a hardwired "0" carry output and a save output hardwired to the one input, when one of the inputs is known to be "1", one of the inputs is known to be "0", and the third input is unknown, said carry output is hardwired to the third input and the save input is connected to the third input through an inverter, and when two of the inputs to a carry save adder means are known to be "1" and the other input is unknown, the carry output is hardwired to be "1" and the save output is hardwired to the other input.

19. In a system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:

overlapped scanning means for scanning said multiplier with S successive bits at a time, each scan overlapping one of the bits of the previous scan, wherein S=4;

assembly means responsive to said successive scanned bits to select and encode modified partial products of said multiplicand for assembly in a plurality of rows of a banded partial product matrix, said assembly means comprising means for computing partial products of X, 2X, 4X and 0 of said multiplicand, means for computing the partial product 3X of said multiplicand, means for computing boundary bits to be used in coded extensions of said partial products, decode means for deriving first code terms, second code terms and third code terms from said scanned bits of each said scan, multiplexor means selecting one of said X, 2X, 4X and 0 partial products of said multiplicand in response to said first code terms, selection means selecting one of said selected partial products from said multiplexor means and said partial product 3X and selecting the sign of the partial product in response to said second code terms, and means responsive to said third code terms of the current and next scan for selecting said boundary bits for a row of said matrix and for inverting the bits of the selected partial product if the selected sign is negative; and means for adding said modified partial products in parallel.

20. In a system as recited in claim 19, wherein a coded extension signifying a hot "1" is appended to the right of the previous partial product row when said selected sign is negative.

21. In a system as recited in claim 19, wherein each row contains a coded sign extension of three bit positions, if the partial product in a given row is positive, said three bit positions appended to the previous row being "0"s and if the partial product in said given row is negative, said three bit positions appended to said previous row being two "0"s followed by "1".

22. In a system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:

overlapped scanning means for scanning said multiplier with S successive bits at a time, each scan overlapping one of the bits of the previous scan, wherein S is at least three;

assembly means responsive to said successive scanned bits to select and encode modified partial products of said multiplicand for assembly in a plurality of rows of a banded partial product matrix, wherein all but the first of said modified partial products have encoded sign extensions, wherein, in all rows but the first and last row, if said partial product is positive, said partial product has an encoded sign extension of (S−1) "1" bits and, if said partial product is negative, said partial product has (S−2) "1" bits followed by a "0" bit in the (S−1)st position, and wherein the last row contains a coded extension to the left of S bits; and means for adding said modified partial products in parallel.

23. In a system as recited in claim 22, wherein said last row, if said partial product is positive, comprises a "1" bit followed by S−1 "0" bits, and if said partial product is negative, comprises a "1" bit followed by S−1 "1" bits.

24. In a system for multiplying a multiplicand X by a multiplier Y, each of which is either a floating point sign magnitude number in binary notation including a sign, a fraction, and an exponent, or an unsigned number in binary notation, means for multiplying the fractions of said sign magnitude numbers or said unsigned numbers, comprising:

overlapped scanning means for scanning said multiplier with S successive bits at a time, each scan overlapping one of the bits of the previous scan, wherein S is at least three;

assembly means responsive to said successive scanned bits to select and encode modified partial products of said multiplicand for assembly in a plurality of rows of a banded partial product matrix; and means for adding said modified partial products in parallel comprising a carry save adder tree for each column of said matrix, each carry save adder tree comprising a plurality of carry save adder logic means, each receiving three inputs, and wherein when all the three inputs of a carry save adder means are unknown, said carry save adder means being a carry save adder logic circuit, and wherein when at least one of the three inputs of a carry save adder means is known, said carry save adder means being simplified logic means.

25. In a system as recited in claim 24, wherein when all three inputs to a carry save adder means are known to be "0", the carry and save outputs of the carry save adder means are hardwired by being tied down to "0"; when two of the three inputs are known to be "0" and the other input is known to be "1", the carry output is tied down to "0" and the save output is tied up to "1"; when two of the inputs are known to be "1", the carry output is tied up to "1" and the save output is tied down to "0"; and when all of the inputs are known to be "1", the carry and save outputs are tied up to "1".

26. In a system as recited in claim 24, wherein when one of said inputs to a carry save adder means is known to be "0" and the other inputs are unknown, said carry save adder means comprises a 2-way AND gate for the carry output and a 2-way Exclusive OR gate for the save output and wherein when said one of said inputs is known to be "1" and the other inputs to a said carry save adder means are unknown, said carry save adder means comprises a 2-way OR gate for the carry output and a 2-way Exclusive NOR gate for the save output.

27. In a system as recited in claim 24, wherein when two of said inputs to a carry save adder means are known to be "0" and one input is unknown, said carry save adder means comprises a hardwired "0" carry output and a save output hardwired to the one input, when one of the inputs is known to be "1", one of the inputs is known to be "0", and the third input is unknown, said carry output is hardwired to the third input and the save input is connected to the third input through an inverter, and when two of the inputs to a carry save adder means are known to be "1" and the other input is unknown, the carry output is hardwired to the "1" and the save output is hardwired to the other input.

* * * * *

UNITED STATES PATENT AND TRADEMARK OFFICE
CERTIFICATE OF CORRECTION

PATENT NO. : 4,918,639  Page 1 of 5

DATED : April 17, 1990

INVENTOR(S) : Eric M. Schwarz and Stamatis Vassiliadis

It is certified that error appears in the above-identified patent and that said Letters Patent is hereby corrected as shown below:

Col. 1, line 56, "term" should read --terms--.

Col. 2, line 46, delete "an".

Col. 5, line 4, after "last" insert --bit--.

Col. 7, line 8, in the equation for "Y", "y0" should read --$y_0$--;

line 11, in the equation for "X", "x0" should read --$x_0$--;

line 13, in the equation for "P", "p0" should read --$p_0$--;

line 16, "x0" should read --$x_0$--, "y0" should read --$y_0$--, and "p0" should read --$p_0$--;

line 22, in the equation for "X", "x0" should read --$x_0$--;

line 24, in the equation for "P", "p0" should read --$p_0$--; and

UNITED STATES PATENT AND TRADEMARK OFFICE
CERTIFICATE OF CORRECTION

PATENT NO. : 4,918,639

DATED : April 17, 1990

INVENTOR(S) : Eric M. Schwarz and Stamatis Vassiliadis

It is certified that error appears in the above-identified patent and that said Letters Patent is hereby corrected as shown below:

Col. 7, line 53, "$-2^{(2-2)}$" should read -- $-2^{(S-2)}$ --.

Col. 10, line 28, in the equation for "LTMSN", "$A_i$" should read --$\bar{A}_i$--;

line 35, "$A_i$" should read --$\bar{A}_i$--.

Col. 12, line 7, "and" should read --an--.

Col. 13, line 17, "is", first occurrence, should read --i--.

Col. 15, line 19, in the equation for "$S_0$", "$Y_{(j)}$" should read --$\bar{Y}_{(j)}$--, "$Y_{(j+1)}$" should read --$\bar{Y}_{(j+1)}$--, and "$Y_{(j-1)}$" should read --$\bar{Y}_{(j-1)}$--;

Col. 15, line 21, in the equation for "$S_0$", "$Y_{(j-2)}$" should read --$\bar{Y}_{(j-2)}$-- and "$Y_{(j-1)}$" should read --$\bar{Y}_{(j-1)}$--;

line 22, in the equation for "$S_1$", "$Y_{(j-1)}$" should read --$\bar{Y}_{(j-1)}$--, "$Y_{(j)}$" should read --$\bar{Y}_{(j)}$--, and "$Y_{(j-2)}$" should read --$\bar{Y}_{(j-2)}$--;

UNITED STATES PATENT AND TRADEMARK OFFICE
CERTIFICATE OF CORRECTION

PATENT NO. : 4,918,639

DATED : April 17, 1990

INVENTOR(S) : Eric M. Schwarz and Stamatis Vassiliades

It is certified that error appears in the above-identified patent and that said Letters Patent is hereby corrected as shown below:

line 23, in the equation for "$S_1$", "$Y_{(j)}$" should read --$\bar{Y}_{(j)}$-- and "$Y_{(j+1)}$" should read --$\bar{Y}_{(j+1)}$--.

Col. 16, line 4, in the equation for "$A_0$", "$Y_{(j-2)}$", both occurrences, should read --$\bar{Y}_{(j-2)}$--, "$Y_{(j-1)}$" should read --$\bar{Y}_{(j-1)}$--, "$Y_{(j)}$" should read --$\bar{Y}_{(j)}$--, and "$Y_{(j+1)}$" should read --$\bar{Y}_{(j+1)}$--;

Col. 16, line 6, in the equation for "$A_1$", "$Y_{(j-2)}$", both occurrences, should read --$\bar{Y}_{(j-2)}$--, "$Y_{(j)}$" should read --$\bar{Y}_{(j)}$--, and "$Y_{(j+1)}$" should read --$\bar{Y}_{(j+1)}$--;

line 7, in the equation for "$A_2$", "$Y_{(j+1)}$" should read --$\bar{Y}_{(j+1)}$-- and "$Y_{(j)}$" should read --$\bar{Y}_{(j)}$--;

line 9, in the equation for "$A_2$", "$Y_{(j)}$" should read --$\bar{Y}_{(j)}$-- and "$Y_{(j-1)}$", both occurrences, should read --$\bar{Y}_{(j-1)}$-- ;

UNITED STATES PATENT AND TRADEMARK OFFICE
CERTIFICATE OF CORRECTION

PATENT NO. : 4,918,639

DATED : April 17, 1990

INVENTOR(S) : Eric M. Schwarz and Stamatis Vassiliades

It is certified that error appears in the above-identified patent and that said Letters Patent is hereby corrected as shown below:

line 11, in the equation for "$A_3$", "$Y_{(j-1)}$", both occurrences, should read --$\overline{Y}_{(j-1)}$--, "$Y_{(j)}$" should read --$\overline{Y}_{(j)}$--, and "$Y_{(j+1)}$" should read --$\overline{Y}_{(j+1)}$--.

Col. 16, line 53, "R," should read --$R_1$--.

Col. 17, line 1, "$Y_{(j+3)}$", second occurrence, should read --$Y_{(j+4)}$--;

line 67, "$205_{57}$" should read --$204_{57}$--.

Col. 18, line 6, "$205_{57}$", first occurrence, should read --$204_{57}$--;

line 63, "applied" should read --applies--.

Col. 19, line 62, "form" should read --term--.

Col. 20, line 20, "form" should read --from--, line 22, "adder" should read --adders--.

Col. 20, line 25, "add" should read --adds--.

UNITED STATES PATENT AND TRADEMARK OFFICE
CERTIFICATE OF CORRECTION

PATENT NO. : 4,918,639

DATED : April 17, 1990

INVENTOR(S) : Eric M. Schwarz and Stamatis Vassiliades

It is certified that error appears in the above-identified patent and that said Letters Patent is hereby corrected as shown below:

Claim 6, line 1, "the" should read --a--.

Claim 7, line 1, "the" should read --a--.

Claim 8, line 6, before "bits", --"1"-- should be inserted.

Signed and Sealed this

Eleventh Day of February, 1992

*Attest:*

HARRY F. MANBECK, JR.

*Attesting Officer*        *Commissioner of Patents and Trademarks*